United States Patent
Ide et al.

(10) Patent No.: US 7,580,628 B2
(45) Date of Patent: Aug. 25, 2009

(54) OPTICAL APPARATUS WITH DUST REDUCTION CAPABILITY

(75) Inventors: Masataka Ide, Hachioji (JP); Junichi Ito, Fuchu (JP)

(73) Assignee: Olympus Imaging Corp., Tokyo (JP)

(*) Notice: Subject to any disclaimer, the term of this patent is extended or adjusted under 35 U.S.C. 154(b) by 508 days.

(21) Appl. No.: 11/366,729

(22) Filed: Mar. 2, 2006

(65) Prior Publication Data
US 2006/0207290 A1  Sep. 21, 2006

(30) Foreign Application Priority Data
Mar. 16, 2005  (JP)  ............... 2005-075865

(51) Int. Cl.
*G03B 17/00* (2006.01)
(52) U.S. Cl. ............... 396/429; 348/335; 348/340; 359/507
(58) Field of Classification Search ............. 348/208.2, 348/208.7, 208.11, 218.1, 335, 340, 262, 348/208.99; 396/429, 55; 359/507, 554
See application file for complete search history.

(56) References Cited

U.S. PATENT DOCUMENTS 7,006,138 B2 * 2/2006 Kawai ............... 348/340

2003/0214599 A1 * 11/2003 Ito et al. ............... 348/335
2004/0047625 A1 * 3/2004 Ito et al. ............... 396/429
2005/0174467 A1 * 8/2005 Kawai ............... 348/335

FOREIGN PATENT DOCUMENTS
JP  2004-048665  2/2004

* cited by examiner

*Primary Examiner*—W. B. Perkey
*Assistant Examiner*—David M. Schindler
(74) *Attorney, Agent, or Firm*—Straub & Pokotylo; John C. Pokotylo

(57) ABSTRACT

The present invention realizes efficient dust removal in an optical apparatus in such a manner that a single circuit drives a plurality of dust reduction optical elements to vibrate. When the optical elements have different resonance frequencies, it can be configured such that the vibration exciting frequency can be changed in a range including the resonance frequencies of all the optical elements. In this case, the optical element driven can also be switched according to the change in frequency so that only the optical element having a resonance frequency close to the driving frequency will be driven. Alternatively, it can be configured such that the driving time or applied voltage can be changed according to the characteristics of the optical element driven.

12 Claims, 29 Drawing Sheets

—— NODE

—— NODE

— NODE

— NODE

FIG. 11A

|  | StartOffest | StopOffest | OSCtime(msec) |
|---|---|---|---|
| t<0°C | 1 | 12 | 100 |
| 0°C≦t<15°C | 2 | 13 | 100 |
| 15°C≦t<30°C | 3 | 14 | 100 |
| 30°C≦t | 4 | 15 | 100 |

|  | StartOffest | StopOffest | OSCtime(msec) |
|---|---|---|---|
| t<0°C | 3 | 11 | 70 |
| 0°C≦t<15°C | 4 | 12 | 70 |
| 15°C≦t<30°C | 5 | 13 | 70 |
| 30°C≦t | 6 | 14 | 70 |

FIG. 12A

| | PRESET VALUE (N) | DRIVING FREQ. (KHz) | | |
|---|---|---|---|---|
| 0 | 493 | 40.57 | | |
| 1 | 494 | 40.49 | | |
| 2 | 495 | 40.40 | | |
| 3 | 496 | 40.32 | → f1 | |
| 4 | 497 | 40.24 | → f2 | |
| 5 | 498 | 40.16 | → f3 | |
| 6 | 499 | 40.08 | → f4 | =fc321 |
| 7 | 500 | 40.00 | → f5 | |
| 8 | 501 | 39.92 | → f6 | =fc323 |
| 9 | 502 | 39.84 | → f7 | |
| 10 | 503 | 39.76 | → f8 | |
| 11 | 504 | 39.68 | → f9 | =fc325 |
| 12 | 505 | 39.60 | → f10 | |
| 13 | 506 | 39.53 | → f11 | |
| 14 | 507 | 39.45 | → f12 | |

*1 → row 3
*2 → row 9
*2' → row 14

FIG. 12B

| | PRESET VALUE (N) | DRIVING FREQ. (KHz) |
|---|---|---|
| 0 | 993 | 20.14 |
| 1 | 994 | 20.12 |
| 2 | 995 | 20.10 |
| 3 | 996 | 20.08 |
| 4 | 997 | 20.06 |
| 5 | 998 | 20.04 |
| 6 | 999 | 20.02 |
| 7 | 1000 | 20.00 |
| 8 | 1001 | 19.98 |
| 9 | 1002 | 19.96 |
| 10 | 1003 | 19.94 |
| 11 | 1004 | 19.92 |
| 12 | 1005 | 19.90 |
| 13 | 1006 | 19.88 |
| 14 | 1007 | 19.86 |

AREA OF DR GLASS

THICKNESS OF DR GLASS

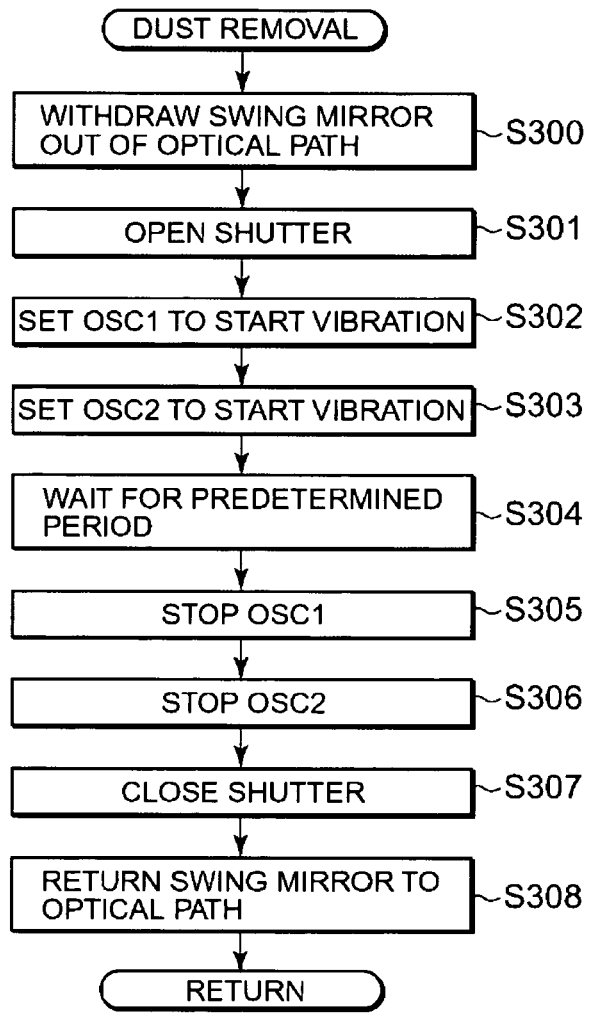
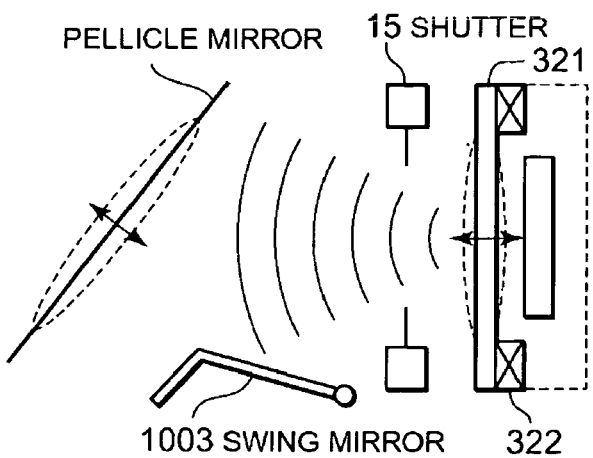

OPTICAL APPARATUS WITH DUST REDUCTION CAPABILITY

CROSS-REFERENCE TO RELATED APPLICATION

This application is based upon and claims the benefit of priority from prior Japanese Patent Application No. 2005-075865, filed on Mar. 16, 2005, the entire contents of which are incorporated herein by reference.

BACKGROUND OF THE INVENTION

1. Field of the Invention

The present invention relates to an optical apparatus with dust reduction capability of removing dust adhering to the inside of the apparatus. For example, as such an optical apparatus with dust reduction capability, there is an electronic imaging apparatus such as a digital camera system provided with a dust reduction function.

2. Description of the Related Art

A technique for removing dust adhering to a cover glass for protecting an image pickup device of an optical apparatus by vibrating the cover glass has been recently proposed as an example of dust reduction technology for optical apparatuses. For example, Japanese Patent Laid-Open No. 2004-48665 discloses a technique for removing dust adhering to a cover glass (dust reduction glass) for protecting an image pickup device by vibrating the dust reduction glass using a piezoelectric element. The piezoelectric element expands and contracts in response to the application of voltage to vibrate the dust reduction glass in a predetermined cycle.

However, in the example of Japanese Patent Laid-Open No. 2004-48665, the description is given only to a system for vibrating the dust reduction glass for the image pickup device in an imaging section.

On the other hand, it is desired that an optical apparatus such as a digital camera will have a dust reduction function for various optical components (for example, focus detection sensor, etc.) other than the image pickup device in the imaging section. However, there has been proposed no dust reduction measures for optical apparatuses provided with dust reduction glasses at multiple positions.

BRIEF SUMMARY OF THE INVENTION

An optical apparatus with dust reduction capability of the present invention includes a plurality of dust reduction optical elements driven to vibrate by a single circuit in a dust removal operation. Since the single circuit drives the dust reduction optical elements, it is effective in providing a compact, low-cost apparatus.

When the plurality of dust reduction optical elements have different resonance frequencies, the optical apparatus can be configured such that the frequency of the drive circuit is changed so that each of dust reduction optical elements will be driven to vibrate at its resonance frequency. In this configuration, since each of the dust reduction optical elements is driven at different timing to vibrate at its resonance frequency, effective dust removal can be performed.

Further, while the driving frequency is being varied, dust reduction optical elements having resonance frequencies different from the current driving frequency can be set not to vibrate at the driving frequency. This can save energy consumption.

The voltage of a vibration exciting signal to be applied can also be changed according to the characteristics of each of the dust reduction optical elements.

Further, the vibration of one dust reduction optical element can be propagated to the other dust reduction optical element using sonic wave action to realize dust removal from both optical elements. In this case, if the vibration exciting signal applied to the former optical element contains both the resonance frequency of the optical element and the resonance frequency of the other optical element, the effect can be enhanced.

In addition, only an optical element to which dust is likely to stick at the last camera action can be targeted for dust removal operation.

As an exemplary structure, an optical apparatus with dust reduction capability of the present invention comprises a plurality of optical units, each of which includes a photoelectric converter for receiving an optical image formed through an imaging optical system and converting it to an electric signal, a dust reduction optical element arranged in front of the photoelectric converter along the optical path, and a vibration exciting element for vibrating the dust reduction optical element. The optical apparatus also comprises a singe drive control circuit for controlling the drive of each of the plurality of vibration exciting elements included in these optical units.

The drive control circuit can be configured to drive each of the vibration exciting elements to scan a predetermined frequency range including the resonance frequency of each of the optical elements. Further, when the optical elements have resonance frequencies different from one another, the drive control circuit can be configured to drive each of the vibration exciting elements to scan a predetermined frequency range including all the different resonance frequencies of the optical elements.

Further, the drive control circuit can be configured to selectively drive each of the vibration exciting elements to vibrate each of the optical elements in a time-sharing manner. Furthermore, when the optical elements have resonance frequencies different from one another, the drive control circuit can be configured to selectively drive each of the vibration exciting elements to scan a predetermined frequency range including the resonance frequency of each of the optical elements so as to vibrate the optical element in a time-sharing manner.

The present invention can also be understood to provide an electronic camera with dust reduction capability.

For example, the electronic camera comprises a plurality of optical units, each of which includes a photoelectric converter for receiving an optical image formed through an imaging optical system and converting it to an electric signal, a dust reduction optical element arranged in front of the photoelectric converter along the optical path, and an electromechanical conversion element for vibrating the dust reduction optical element. The electronic camera also comprises a single drive circuit for driving each of the plurality of electromechanical conversion elements included in these optical units, and a control circuit for controlling the operation of the drive circuit.

The electronic camera can also be configured such that the drive circuit has a switching circuit for selectively driving each of the electromechanical conversion elements, and the control circuit controls the operation of the drive circuit to change the driving frequencies depending on the electromechanical conversion element selectively driven.

The drive circuit can also has an applied voltage varying circuit for varying the applied voltage to each of the electromechanical conversion elements on an element basis.

Further, the electronic camera can be configured such that the drive circuit has an applied voltage varying circuit for varying the applied voltage to each of the electromechanical conversion elements on an element basis, and a switching circuit for selectively driving each of the electromechanical conversion elements. In this configuration, the control circuit controls the operation of the applied voltage varying circuit to change the applied voltage depending on the electromechanical conversion element selectively driven.

Furthermore, the electronic camera can be configured such that the drive circuit has a switching circuit for selectively driving each of the electromechanical conversion elements, and the control circuit controls the operation of the drive circuit to change the driving time depending on the electromechanical conversion element selectively driven. In this case, the dust removal effect can be enhanced by setting proper driving time.

In addition, for example, the electronic camera can be configured such that at least one of the plurality of optical units is an imaging optical unit including a photoelectric converter for receiving an optical image formed through an imaging optical system, and at least one of the plurality of optical units is a finder optical unit including a photoelectric converter for receiving an optical image formed through a finder optical system.

The electronic camera can also be such that at least one of the plurality of optical units is an imaging optical unit including a photoelectric converter for receiving an optical image formed through an imaging optical system, and at least one of the plurality of optical units is a focus detection optical unit including a photoelectric converter for receiving an optical image formed through a focus detection optical system.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 11A shows the details of a temperature correction table corresponding to vibration mode 1;

FIG. 11B shows the details of a temperature correction table corresponding to vibration mode 2;

FIG. 12A shows the details of a frequency correction table corresponding to vibration mode 1;

FIG. 12B shows the details of a frequency correction table corresponding to vibration mode 2;

FIG. 31 is a flowchart of dust removal operation according to the seventh embodiment of the present invention; and FIG. 32 is a schematic diagram for explaining dust removal operation.

DETAILED DESCRIPTION OF THE PREFERRED EMBODIMENT

Preferred embodiments of the invention are described below with reference to the accompanying drawings.

The following embodiments take a digital camera system having a plurality of photoelectric converters as an optical apparatus with dust reduction capability by way of example to describe the present invention. However, the present invention is applicable to optical apparatuses other than the digital camera system.

First Embodiment

Figure 1:
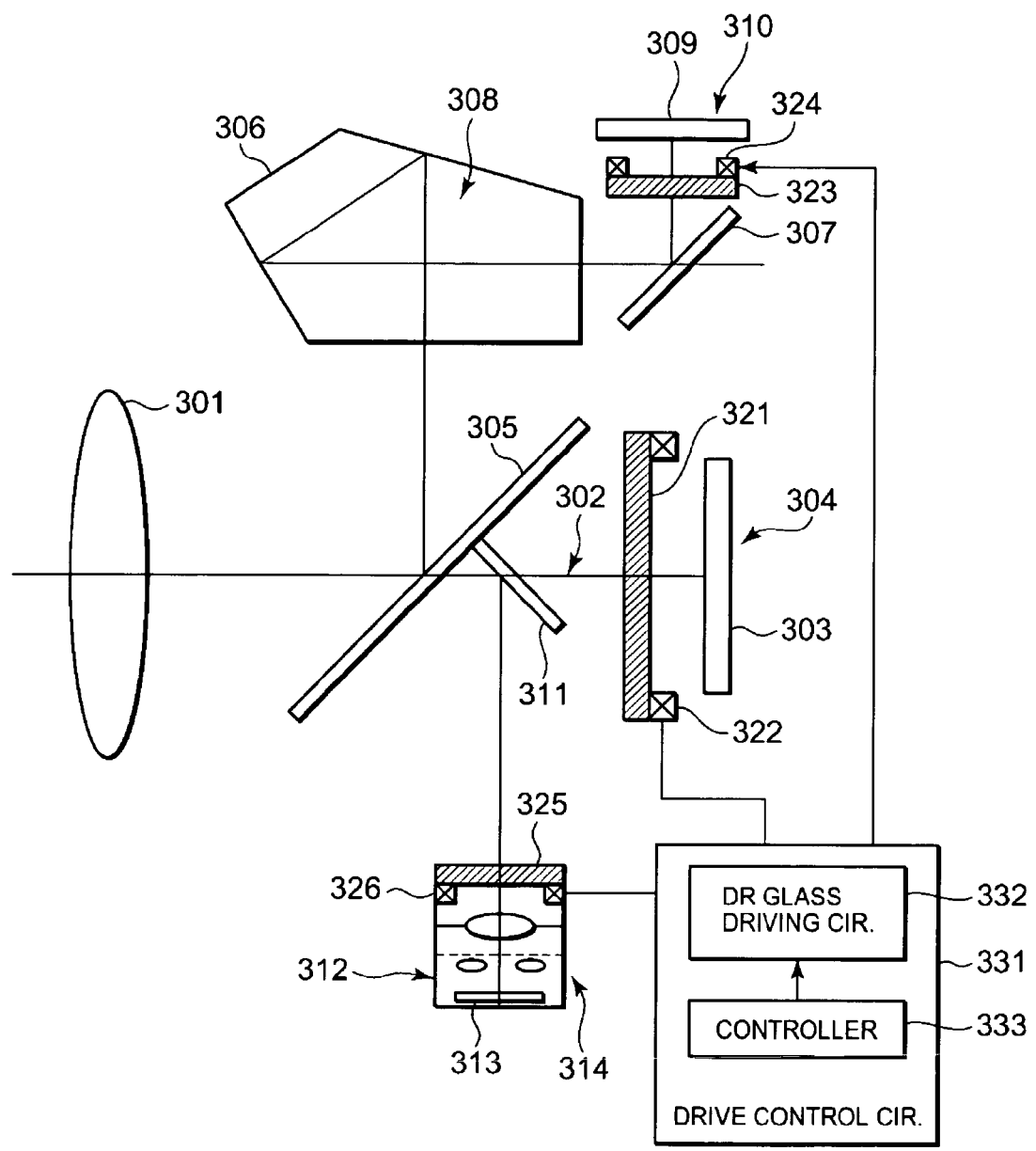
FIG. 1 is a schematic diagram of a digital camera system as an optical apparatus with dust reduction capability according to a first embodiment of the present invention.

FIG. 1 is a schematic diagram of a digital camera system as an optical apparatus with dust reduction capability according to a first embodiment of the present invention. FIG. 1 shows the structure of the digital camera with consideration given to an actual optical arrangement.

The optical apparatus with dust reduction capability includes an imaging optical section 304. The imaging optical section 304 has an imaging optical system 302 and a CCD unit 303. The imaging optical system 302 is an image-forming optical system having a taking lens 301 as its main part. The CCD unit 303 is a photoelectric converter, or to be more specific, an imaging photoelectric converter, for receiving an optical subject image formed through the imaging optical system 302 and converting it to an electric signal.

The optical apparatus with dust reduction capability also includes a finder optical section 310. The finder optical section 310 has a finder optical system 308 and a finder CCD unit 309. The finder optical system 308 is an imaging optical system, mainly consisting of a pentaprism 306 and a half mirror 307, for forming an image from a beam of light passing through the taking lens 301 and selectively branched by a quick-return mirror 305. The finder CCD unit 309 is a photoelectric converter, or to be more specific, a finder photoelectric converter, for receiving an optical image formed through the finder optical system 308 and converting it to an electric signal.

The optical apparatus with dust reduction capability further includes an AF detection optical section 314 as a focus detection optical section. The AF detection optical section 314 has an AF detection optical system (focus detection optical system) 312 and an AF sensor unit 313. The AF detection optical section 314 is an image-forming optical system for receiving a flux of light passing through the taking lens 301 and reflected on a sub-mirror 311 at the back of the quick-return mirror 305 to detect the focal state of the taking lens 301. The AF sensor unit 313 is a photoelectric converter, or to be more specific, a focus detection photoelectric converter, for receiving an optical image formed through the AF detection optical system 312 and converting it to an electric signal.

The imaging optical section 304 also has a dust reduction glass 321 as a dust-reduction optical element provided in front of the CCD unit 303 along the optical path, and a piezoelectric element 322 as a vibration exciting element for vibrating the dust reduction glass 321. The finder optical section 310 also has a dust reduction glass 323 as a dust-reduction optical element provided in front of the finder CCD unit 309 along the optical path and a piezoelectric element 324 as a vibration exciting element for vibrating the dust reduction glass 323. The AF detection optical section 314 also has an AF sensor unit 313, a dust reduction glass 325 as a dust-reduction optical element provided in front of the AF detection optical system 312 along the optical path, and a piezoelectric element 326 as a vibration exciting element for vibrating the dust reduction glass 325.

In other words, in the first embodiment, the piezoelectric elements 322, 324, and 326 as electromechanical conversion elements made of piezoelectric ceramic or the like are used as vibration exciting elements. However, the vibration exciting elements are not limited thereto. Any kind of vibration exciting element can be used as long as it can vibrate the dust reduction glasses 321, 323, 325 properly. For example, a magnetostrictive vibrator can be used as the electromechanical conversion element used in the vibration exciting element. Alternatively, a moving coil can also be used as the vibration exciting element like in the structure of a speaker.

The optical apparatus with dust reduction capability further includes a single drive control section 331. The drive control section 331 is a drive control circuit not only for various operation control of the apparatus, but also for driving control of the plurality of piezoelectric elements 322, 324, and 326 included in the optical section 304, 310, and 314, respectively. The drive control section 331 has a dust-reduction glass driving circuit 332 and a controller 333. The dust-reduction glass driving circuit 332 is a single drive circuit for driving these piezoelectric elements 322, 324, and 326 at predetermined driving frequencies to vibrate the dust reduction glasses 321, 323, and 325, respectively. The controller 333 is a control circuit for controlling the operation of the dust-reduction glass driving circuit 332.

Figure 2:
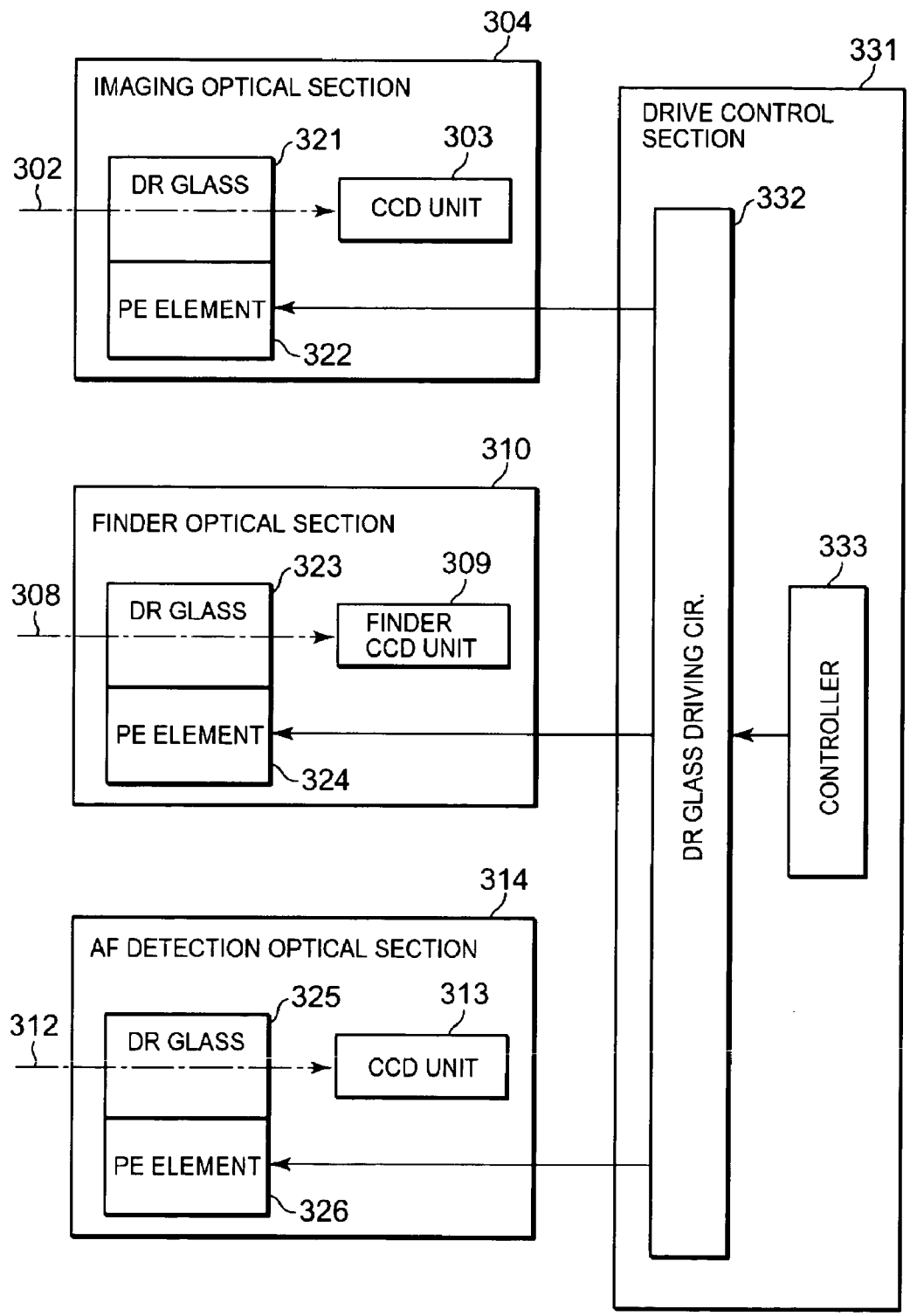
FIG. 2 is a schematic block diagram mainly showing a control system corresponding to the structure example of FIG. 1.
Figure 3:
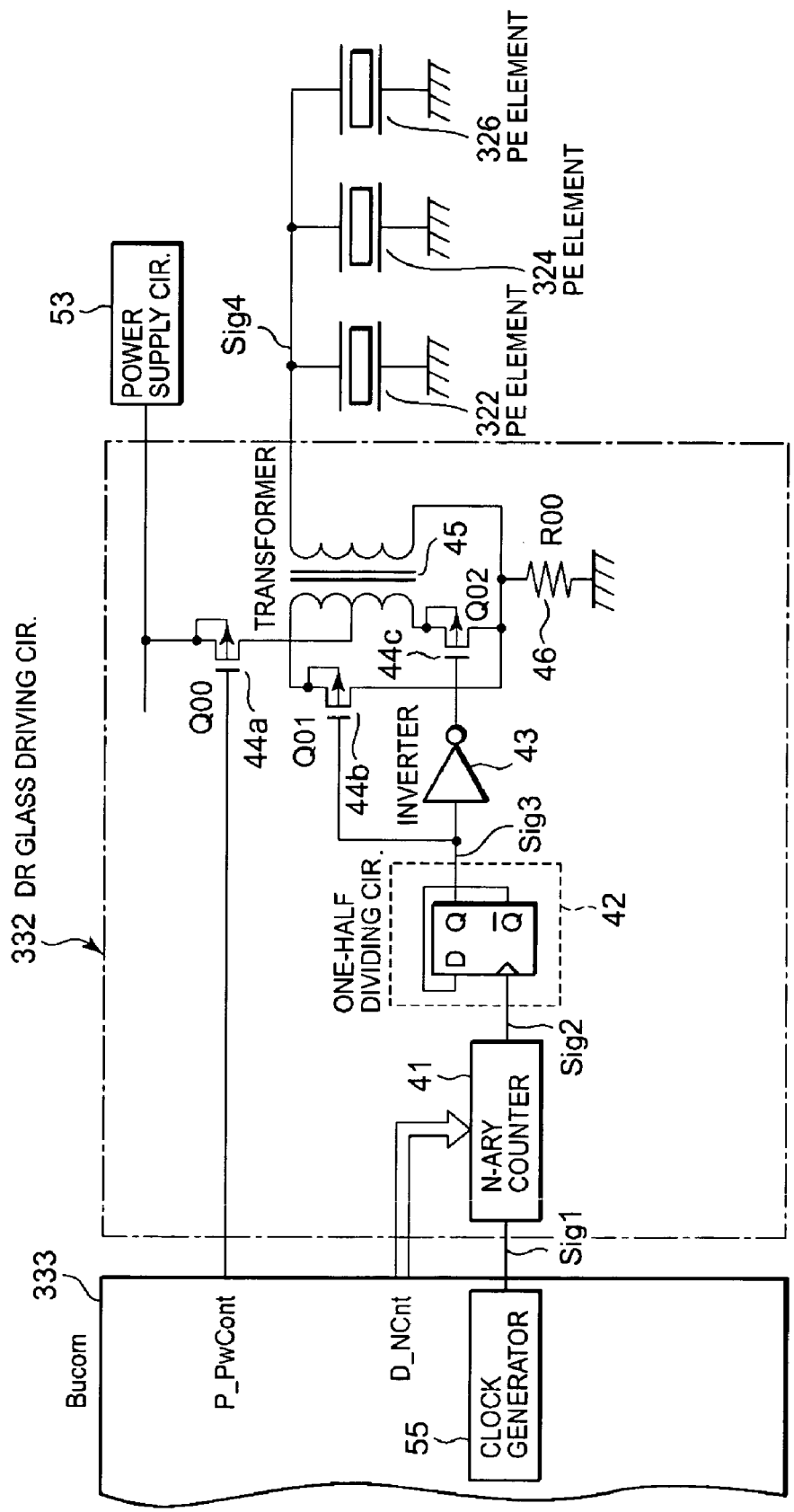
FIG. 3 is a circuit diagram showing an exemplary structure of a dust-reduction glass driving circuit for piezoelectric elements.
Figure 4:
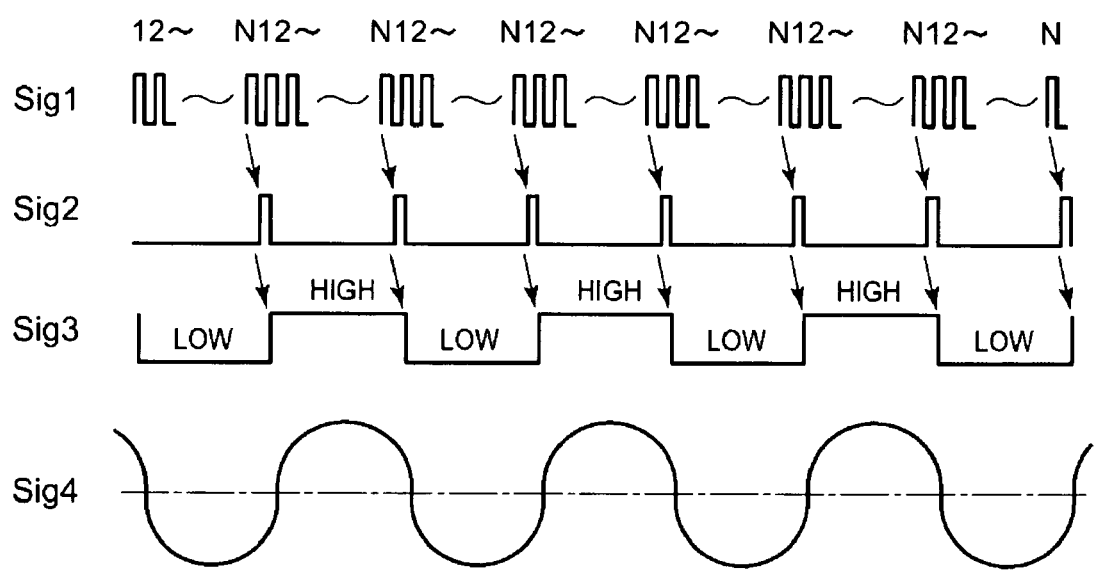
FIG. 4 is a time chart showing an operation control example.

FIG. 2 is a schematic block diagram mainly showing a control system corresponding to the structure example of the fist embodiment shown in FIG. 1. FIG. 3 is a circuit diagram showing an exemplary structure of the dust-reduction glass driving circuit 332 for the piezoelectric elements 322, 324, and 326. FIG. 4 is a time chart showing an example of operation control.

The following describes the driving and control operation of the dust reduction glasses 321, 323, and 325 according to the first embodiment of the present invention with reference to FIGS. 3 and 4. The dust-reduction glass driving circuit 332 has the circuit structure as shown in FIG. 3. Waveform signals (Sig 1 to Sig 4) represented on the time chart of FIG. 4 are generated at each component of the dust-reduction glass driving circuit 332, and based on these signals, the piezoelectric elements 322, 324, and 326 are controlled as follows.

As shown in FIG. 3, the dust-reduction glass driving circuit 332 has an N-ary counter 41, a one-half dividing circuit 42, an inverter 43, a plurality of MOS transistors (Q00, Q01, Q02) 44a, 44b, 44c, a transformer 45, and a resistor (R00) 46.

In the dust-reduction glass driving circuit 332, a signal (Sig 4) having a predetermined period is generated on the secondary side of the transformer 45 in response to turning on/off of the transistor (Q01) 44b and the transistor (Q02) 44c connected on the primary side of the transformer 45. Then, based on the signal having the predetermined period, the piezoelectric elements 322, 324, and 326 are driven to resonate the dust reduction glasses 321, 323, and 325 (to be described in detail later).

The control section 333 controls the dust-reduction glass driving circuit 332 through two control ports, an IO port P_PwCont and an IO port D_NCnt, and an internal clock generator 55 in a manner as follows: The clock generator 55 outputs a pulse signal (basic clocking signal) to the N-ary counter 41 at a frequency much faster than the signal frequencies applied to the piezoelectric elements 322, 324, and 326. The output signal is the waveform signal Sig 1 represented on the time chart of FIG. 4. The basic clocking signal is input into the N-ary counter 41.

The N-ary counter 41 counts the pulse signal and outputs a count complete pulse signal each time it reaches a predetermined value "N." In other words, the basic clocking signal is 1/N-divided. This output signal is the waveform signal Sig 2 represented on the time chart of FIG. 4. The duty ratio of the divided pulse signal between the high and low periods is not 1:1. Therefore, the pulse signal is converted through the one-half dividing circuit 42 so that the duty ratio will become 1:1. The converted pulse signal corresponds to the waveform signal Sig 3 represented on the time chart of FIG. 4.

When the converted pulse signal is high, the MOS transistor (Q01) 44b into which the signal is input is turned on. On the other hand, the pulse signal is applied to the transistor (Q02) 44c via the inverter 43. Therefore, when the pulse signal is low, the transistor (Q02) 44c into which the signal is input is turned on. Thus, the transistor (Q01) 44b and the transistor (Q02) 44c connected on the primary side of the transformer 45 are turned on alternately in response to the pulse signal Sig 3. As a result, a signal having a period of signal Sig 4 as shown in FIG. 4 is generated.

The winding ratio of the transformer 45 is determined from the output voltage of a power supply circuit 53 and the voltage necessary to drive the piezoelectric elements 322, 324, and 326. Note here that the resistor (R00) 46 is provided to prevent excessive current from flowing through the transformer 45.

For driving the piezoelectric elements 322, 324, and 326, it is required that the transistor (Q00) 44a be on and voltage be applied to the center tap of the transformer 45 from the unit of the power supply circuit 53.

The on/off control of the transistor (Q00) 44a is performed through the IO port P_PwCont. The set value "N" for the N-ary counter 41 can be set from the IO port D_NCnt. Therefore, the control section 333 can control the set value "N" properly to change the driving frequencies of the piezoelectric elements 322, 324, and 326.

The frequency can be determined by the following equation 1):

$$fdrv = fpls/2N \quad \quad 1)$$

where N is the set value for the counter, fpls is the frequency of the output pulse of the clock generator, and fdrv is the frequency of the signal applied to the piezoelectric element.

The operation based on the equation 1) is performed by a CPU (not shown) in the control section 333.

Thus, the digital camera system as the optical apparatus with dust reduction capability according to the first embodiment of the present invention basically includes the drive control section 331 consisting of the single dust-reduction glass driving circuit 332 for driving the piezoelectric element 322, 324, and 326 included in the optical section 304, 310, and 314, respectively, and the controller 333. Therefore, there is no need to provide a drive circuit and a controller individually for each of the piezoelectric elements 322, 324, 326. This makes it possible to prevent the scale of the driving control system circuit from increasing, and hence to achieve a proper dust-reduction effect at a low cost.

Figure 5:
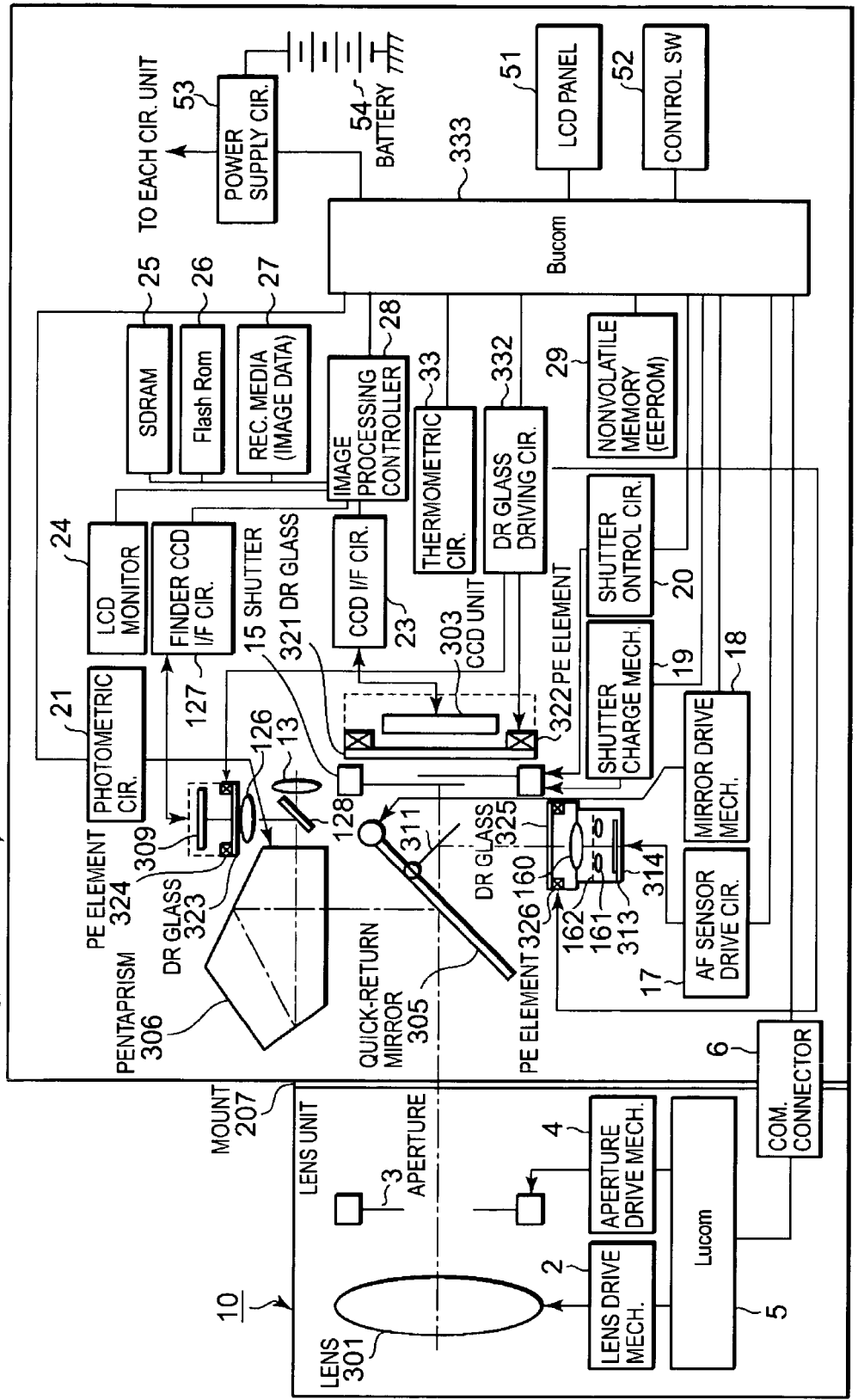
FIG. 5 is a block diagram showing a specific example of the structure of a digital camera system equipped with the optical apparatus with dust reduction capability shown in FIG. 1.

FIG. 5 is a block diagram showing a specific example of the structure of the digital camera system equipped with the optical apparatus with dust reduction capability. The digital camera system mainly consists of a lens unit 10 as an interchangeable lens and a body unit 100 as a camera body. A desired lens unit 10 is removably attached to the front of the body unit 100 through a mount 207.

The lens unit 10 is controlled by a lens control microcomputer (hereinafter called "Lucom") 5. The body unit 100 is controlled by the control section 333 mentioned above. In the following description, the control section 333 is represented as a body control microcomputer ("Bucom") 333. When the lens unit 10 is mounted on the body unit 100, the Lucom 5 and the Bucom 333 are electrically connected through a communication connector 6 so that they can communicate with each other. The Lucom 5 cooperates dependently with the Bucom 333 to operate the camera system.

The taking lens 301 and the aperture 3 are provided inside the lens unit 10. The taking lens 301 is driven by a DC motor (not shown) provided in a lens drive mechanism 2. The aperture 3 is driven by a stepping motor (not shown) provided in an aperture drive mechanism 4. The Lucom 5 controls each motor in accordance with instructions from the Bucom 333.

Various other components are arranged inside the body unit 100 as shown in FIG. 5. For example, there are provided single lens reflex components (the quick-return mirror 305, the pentaprism 306, an eyepiece 13, and the sub-mirror 311) as the optical system, a focal plane shutter 15 arranged on the optical axis, and the AF detection optical section 314 for automatic distance measurements from a flux of light reflected from the sub-mirror 311. The AF detection optical section 314 has a condensing lens 160, a separator lens 161, a separator aperture 162, and the AF sensor unit 313 having a line sensor arrangement.

Also provided in the body unit 100 are an AF sensor drive circuit 17 for controlling the drive of the AF detection optical section 314, a mirror drive mechanism 18 for controlling the drive of the quick-return mirror 305, a shutter charge mechanism 19 for charging a spring driving the front and rear curtains of the shutter 15, and a shutter control circuit 20 for controlling the motion of the front and rear curtains. Further provided in the body unit 100 is a photometric circuit 21 for photometric measurements based on a flux of light from the pentaprism 306.

The CCD unit 303 located on the optical axis of the taking lens 301 is provided as a photoelectric converter for photoelectrically converting a subject image passing through the imaging optical system 302. The dust reduction (DR) glass 321 is provided between the CCD unit 303 and the taking lens 301. The piezoelectric (PE) element 322 for vibrating the dust reduction glass 321 at a predetermined frequency is attached along the circumference of the dust reduction glass 321. The piezoelectric element 322 vibrates the dust reduction glass 321 through the dust-reduction glass driving circuit 332 to remove dust adhering to the glass surface.

On the other hand, the finder CCD unit 309 located on the optical axis of the finder is provided as a photoelectric converter for photoelectrically converting the subject image passing through the finder optical system 308. The half mirror 307 and a finder CCD lens 126 are arranged to reflect and guide part of the subject image passing through the finder optical system 308 to the finder CCD unit 309.

The image formed by the finder CCD unit 309 is displayed on a liquid crystal (LCD) monitor 24 arranged on the back of the camera body. This allows the user to monitor the image before shooting without looking through the finder. The finder CCD unit 309 is protected by the dust reduction glass 323 provided on the optical path between the finder CCD unit 309 and the finder CCD lens 126. The piezoelectric element 324 for vibrating the dust reduction glass 323 at a predetermined frequency is attached along the circumference of the dust reduction glass 323. The piezoelectric element 324 vibrates the dust reduction glass 323 through the dust-reduction glass driving circuit 332 to remove dust adhering to the glass surface.

The AF detection optical section 314 is protected by the dust reduction glass 325 arranged in parallel with the AF sensor unit 313 and in front of the AF sensor unit 313 and the AF detection optical system 312 along the optical path. The dust reduction glass 325 protects the AF detection optical system 312 in such a manner as to seal the AF detection optical system 312 hermetically. The piezoelectric element 326 for vibrating the dust reduction glass 325 at a predetermined frequency is attached along the circumference of the dust reduction glass 325. The piezoelectric element 326 vibrates the dust reduction glass 325 through the dust-reduction glass driving circuit 332 to remove dust adhering to the glass surface.

If there is no dust reduction glass 325, dust particles entering the inside through the mount 207 while the user is changing lenses will stick to the outer surface of the condensing lens 160, adversely affecting the AF detection result. On the other hand, if the dust reduction glass 325 protects the AF detection optical system 312 from dust entering inside the camera and the piezoelectric element 326 vibrates the dust reduction glass 325 to remove the dust particles from the outer surface of the dust reduction glass 325, the degradation of AF detection accuracy can be avoided.

Thus, the digital camera system according to the first embodiment of the present invention as shown in FIG. 5 is an electronic camera having such a basic structure as belonging to the so-called "camera with dust reduction capability."

A thermometric circuit 33 is provided near the dust reduction (DR) glasses 321, 323, and 325 to measure ambient temperature around each of the CCD unit 303, the finder CCD unit 309, and the AF sensor unit 313.

A CCD interface circuit 23 is connected to the CCD unit 303. A finder CCD interface circuit 127 is connected to the finder CCD unit 309. Further, an image processing controller 28 is provided in the digital camera system. The image processing controller 28 processes images using the CCD interface circuit 23, the finder interface circuit 127, the LCD monitor 24, and an SDRAM 25, a flash ROM 26, and a recording medium 27 provided as storage areas, etc. Thus, the digital camera system provides an electronic recoding/display function as well as the electronic imaging function. As still another storage area, a nonvolatile memory 29 such as an EEPROM is provided for storing control parameters necessary for camera control and accessible from the Bucom 333.

An LCD control panel 51 for showing the operating conditions of the digital camera system to the user, and a camera control SW 52 are provided and connected to the Bucom 333. The camera control SW 52 is a group of switches including operation buttons necessary to operate the camera, such as a shutter release SW, a mode change SW, and a power SW. Further, a battery 54 as a power supply, and a power supply circuit 53 for converting the power supply voltage to voltage for each of the circuit units constituting the digital camera system and supplying the voltage to each circuit unit are provided.

The following describes the operation of each component in the digital camera system configured such above. The image processing controller 28 controls the CCD interface circuit 23 or the finder CCD interface circuit 127 in accordance with instructions from the Bucom 333 to capture image data from the CCD unit 303 or the finder CCD unit 309. The image processing controller 28 converts the image data to a video signal and outputs the video signal to the LCD monitor 24. Thus, the user can preview the image shot on the LCD monitor 24.

The SDRAM 25 is a memory for temporary storage of image data, and is used as a work area for converting image data, or the like. The image data is stored on the recording medium 27 after converted to JPEG data.

The CCD unit 303 is protected by the transparent dust reduction glass 321 as mentioned above. The piezoelectric element 322 is arranged along the circumference of the dust reduction glass 321 to vibrate the glass surface. The piezoelectric element 322 is driven by the dust-reduction glass driving circuit 332 in a manner to be described later. In order to enhance the dust reduction effect, it is preferable that the CCD unit 303 and the piezoelectric element 322 be integrally housed in a case surrounded by a frame indicated by the dashed line with the dust reduction glass 321 as its one side.

In general, temperature affects the elastic coefficient of a glass material to vary its natural frequency. It is therefore preferable to allow for variations of the natural frequency by measuring the temperature when the camera is in operation. Since the temperature of the CCD unit 303 rises sharply during operation, it is also preferable that a change in the temperature of the dust reduction glass 321 provided for protecting the CCD unit 303 be measured to estimate the natural frequency at that time. In the first embodiment, a sensor (not shown) connected to the thermometric circuit 33 is provided for measuring ambient temperature around the CCD unit 303. The temperature measuring point of the sensor is preferably set very close to the vibrating surface of the dust reduction glass 321.

Like the CCD unit 303, the finder CCD unit 309 is also protected by the transparent dust-reduction glass 323. The piezoelectric element 324 is arranged along the circumference of the dust reduction glass 323 to vibrate the glass surface. The piezoelectric element 324 is driven by the dust reduction glass driving circuit 332. In order to enhance the dust reduction effect, it is preferable that the finder CCD unit 309 and the piezoelectric element 324 be integrally housed in a case surrounded by a frame indicated by the dashed line with the dust reduction glass 323 as its one side.

Further, in order to measure a change in the temperature of the dust reduction glass 323 to estimate the natural frequency at that time, a sensor (not shown) connected to the thermometric circuit 33 is provided for measuring ambient temperature around the finder CCD unit 309. The temperature measuring point of the sensor is preferably set very close to the vibrating surface of the dust reduction glass 323.

The mirror drive mechanism 18 is a mechanism for driving the quick-return mirror 305 to up and down positions. When the quick-return mirror 305 is at the down position, the flux of light from the taking lens 301 is divided and guided to the side of the AF detection optical section 314 and the side of the pentaprism 306, respectively. The output of the AF sensor unit 313 in the AF detection optical section 314 is sent to the Bucom 333 through the AF sensor drive circuit 17, and known distance measurement processing is performed.

On the other hand, the user can view the subject through the eyepiece adjacent to the pentaprism 306. A part of the flux of light passing through the pentaprism 306 is guided to a photosensor (not shown) in a photometric circuit 21, and known photometric processing is performed based on the amount of light detected.

Figure 6:
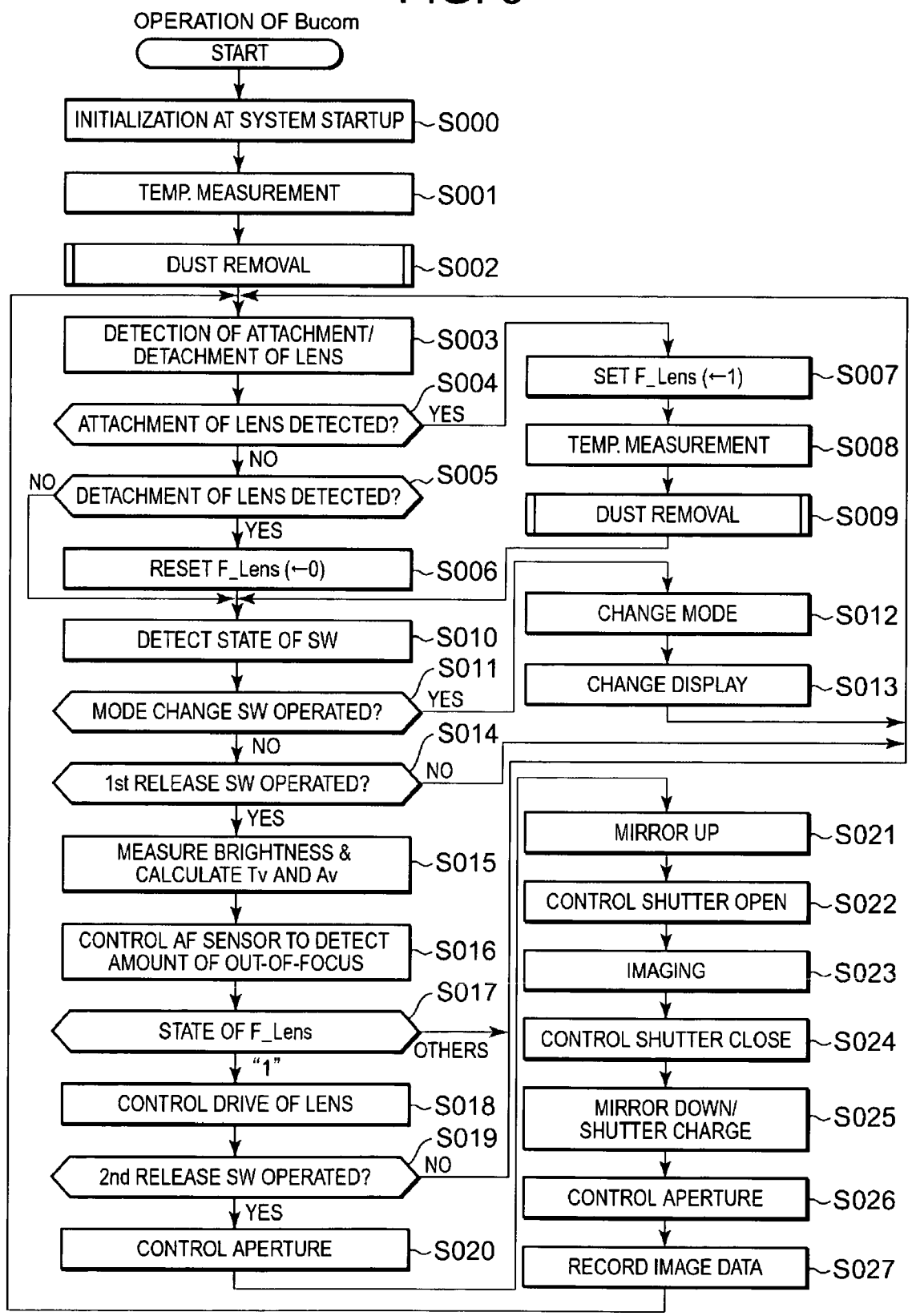
FIG. 6 is a flowchart showing the main routine of a control program.

The following specifically describes control processing performed by the camera body control microcomputer (Bucom) 333 as the above-mentioned control section. FIG. 6 illustrates the main routine of a control program running on the Bucom 333. First, when the power supply SW (not shown) of the camera is turned on, the Bucom 333 starts operating. In step S000, processing for starting the camera system is performed. In other words, the Bucom 333 controls the power supply circuit 53 to supply power to each circuit unit in the camera system and initializes each circuit.

In step S001, current temperature data of each unit is captured from the thermometric circuit 33. The temperature data is information necessary for the next operation routine in step S002. In step S002, a sub-routine "dust removal operation" is called. In the sub-routine, the dust reduction glasses 321, 323, and 325 are vibrated to shake off dust. Since this operation is performed upon startup, dust particles adhering to the glasses while the camera has not been used for shooting can be removed. The details of the sub-routine will be described later.

The following step S003 is executed periodically, in which the Bucom 333 communicates with the Lucom 5 to detect the state of the lens unit 10. When it is detected in step S004 that the lens unit 10 has been attached to the body unit 100, the procedure proceeds to step S007. Otherwise, it proceeds to step S005.

When it is detected in step S005 that the lens unit 10 has been detached from the body unit 100, the procedure proceeds from step S005 to step S006. Then, in step S006, a control flag F_Lens is reset, and the procedure proceeds to step S010. Otherwise, it proceeds from step S005 to step S010.

In step S007, the control flag F_Lens is set. The control flag indicates "1" when the lens unit 10 is mounted on the camera body 100, while it indicates "0" when the lens unit 10 is unmounted on the camera body 100. Then, in step S008, temperature is measured. In the subsequent step S009, the sub-routine "dust removal operation" for removing dust from the dust reduction glasses 321, 323, and 325 is called and executed. Then, the procedure proceeds to step S010.

In general, dust particles are likely to stick to the lenses and the dust reduction glasses 321, 323, 325 when the lens unit 10 is not on the camera body 100. Therefore, it is desired that the dust removal operation should be performed at the time when it is detected that the lens unit 10 has been attached to the camera body 100. Alternatively, steps S008 and S009 may be executed periodically regardless of whether the lens unit 10 is mounted on the camera body or not. In this case, however, the dust reduction glasses 321, 323, 325 are apt to be vibrated in such a state that no dust adheres on their surfaces, resulting in wasted power consumption. Therefore, in the embodiment, the dust removal operation is performed at the time when it is detected that the lens unit 10 has been attached to the camera body as a result of determination on the presence or absence of the lens unit 10 on the camera body.

In step S010, the state of the camera control SW 52 is detected. Then, in step S011, when a change in the state of the mode change SW (not shown) as one of the camera control SW 52 is detected, the procedure proceeds to step S012. In step S012, the camera operation mode is changed in conjunction with the operation of the mode change SW. In step S013, information on the operation mode changed is output and displayed on the LCD control panel 51 for showing the operating conditions of the digital camera system. After that, the procedure returns to step S003.

In step S014, it is determined whether a 1st. release SW (not shown) as one of the camera operation SW is operated. When the 1st. release SW is on, the procedure proceeds to step S015, while it is off, the procedure returns to step S003. In step S015, brightness information on the subject is acquired from the photometric circuit 21. Then, from this information, the exposure time (Tv value) of the CCD unit 303 and the aperture setting value (Av value) of the taking lens 1 are determined.

In step S016, data detected by the AF sensor unit 313 is acquired via the AF sensor drive circuit 17. Then, based on the data, the amount of out-of-focus is determined. Then, in step S017, the state of F_Lens is determined. If it is "0," since it means that there is no lens unit 10 mounted on the camera body 100, shooting operations starting from step S018 cannot be performed. Therefore, in this case, the procedure returns to step S003. Then, in step S018, the Bucom 333 sends the amount of out-of-focus and instructs the Lucom 5 to drive the taking lens 1 based on the amount of out-of-focus.

In step S019, it is determined whether a 2nd. release SW (not shown) as one of the camera operation SW 52 is operated. When the 2nd. release SW is on, the procedure proceeds to step S020 to perform predetermined shooting operations, while it is off, the procedure returns to step S003.

In step S020, the Bucom 333 sends the Av value and instructs the Lucom 5 to drive the aperture 3 based on the Av value. In step S021, the quick-return mirror 305 is moved to the up position. In step S022, the traveling of the front curtain of the shutter 15 is started, and in step S023, the Bucom 333 instructs the image processing controller 28 to start its imaging operation. After completion of exposure to the CCD unit 303 for a period of time specified by the Tv value, the traveling of the rear curtain of the shutter 15 is started in step S024. In step S025, the quick-return mirror 305 is moved to the down position, while the shutter 15 is charged.

Then, in step S026, the Bucom 333 instructs the Lucom 5 to return the aperture 3 to the maximum size. In step S027, Bucom 333 instructs the image processing controller 28 to record image data of the image shot on the recording medium 27. After completion of recording the data, the procedure returns to step S003.

The following describes the support structure and vibration forms of the dust reduction glasses 321, 323, 325. The dust reduction glasses 321, 323, 325 have the same structure, so that the description is made only about the dust reduction glass 321.

In the camera system according to the first embodiment, it is assumed that the dust reduction glass 321 has a disc-like shape. Then, since the piezoelectric element 322 for vibrating the dust reduction glass 321 is arranged along the circumference of the dust reduction glass 321 as a round glass plate, the glass plate is supported around its circumference. Here, the glass plate can vibrate in multiple vibration modes (vibration forms). According to the present invention, two modes are selected from the multiple vibration modes. FIGS. 7A, 7B, 8A and 8B show how the glass plate vibrates in the mode selected.

Figure 7A:
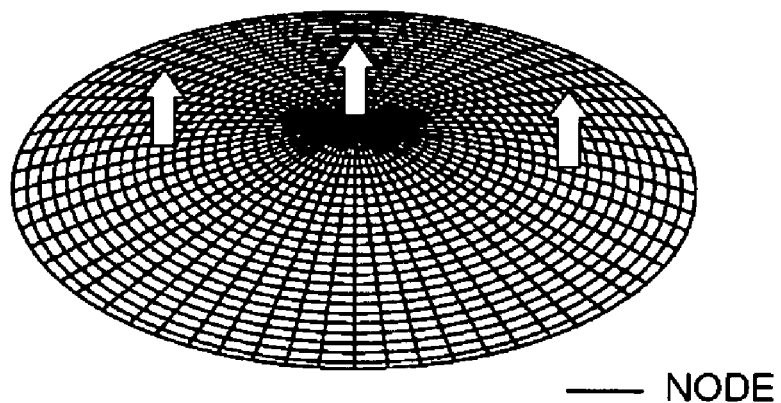
FIG. 7A is an illustration of a vibration form of a dust reduction glass as an aspect of a vibration mode 1 according to the present invention, in which the entire area of the glass plate vibrates in phase, with a node formed along the circumference of the glass plate.
Figure 7B:
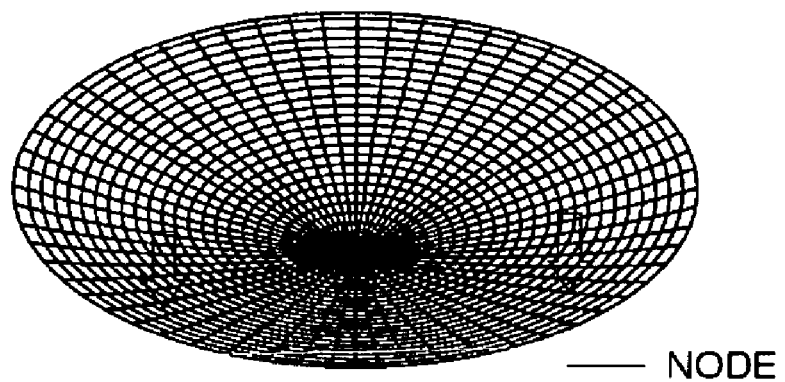
FIG. 7B is an illustration of the vibration form of the dust reduction glass as another aspect of the vibration mode 1 according to the present invention, in which the entire area of the glass plate vibrates in phase, with the node formed along the circumference of the glass plate.

The dust reduction glass 321 according to the first embodiment can take a vibration form as shown in FIGS. 7A and 7B. In other words, when the piezoelectric element 322 functioning as a vibration exciting element applies vibration to the glass, though there is a "node" along the circumference of the glass plate where no vibration takes place, almost the entire area of the glass vibrates in phase while alternating between states as indicated by large open arrows in FIGS. 7A and 7B. This vibration form is called "vibration mode 1" below.

Figure 8A:
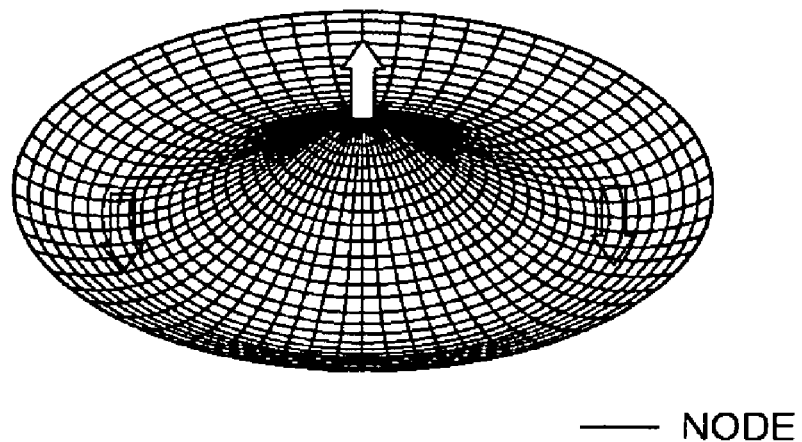
FIG. 8A is an illustration of a vibration form of a dust reduction glass as an aspect of a vibration mode 2 according to the present invention, in which the inside and outside of the glass plate vibrates with a phase difference of 180° with each other.
Figure 8B:
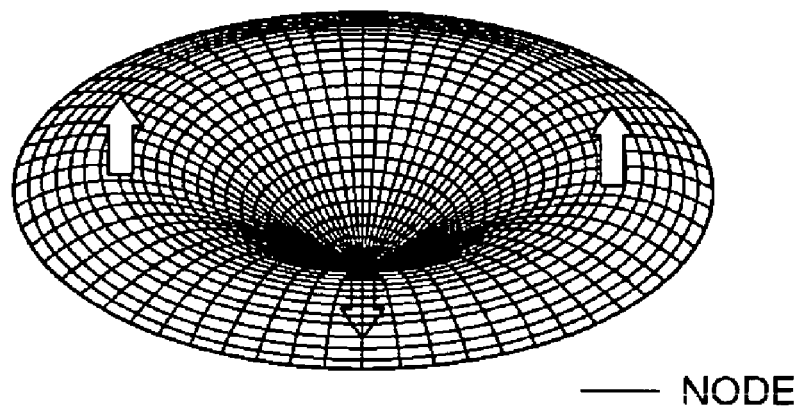
FIG. 8B is an illustration of the vibration form of the dust reduction glass as another aspect of the vibration mode 2 according to the present invention, in which the inside and outside of the glass plate vibrates with a phase difference of 180° with each other.

The dust reduction glass 321 of the first embodiment can also vibrate in such a form as shown in FIGS. 8A and 8B depending on the frequency of vibration applied. In other words, the vibration form of the dust reduction glass 321 illustrated in FIGS. 8A and 8B indicates that the dust reduction glass 321 vibrates with a phase difference of 180° between the inside and the outside of the glass plate. Specifically, this vibration form is such a mode that causes nodes along the circumference and the inside of the glass plate, respectively. As shown, the vibration in an area surrounded by the inside node and the vibration in an outside area (doughnut-shaped area) of the inside node are 180° out of phase with each other. This mode is called "vibration mode 2" below.

Figure 9:
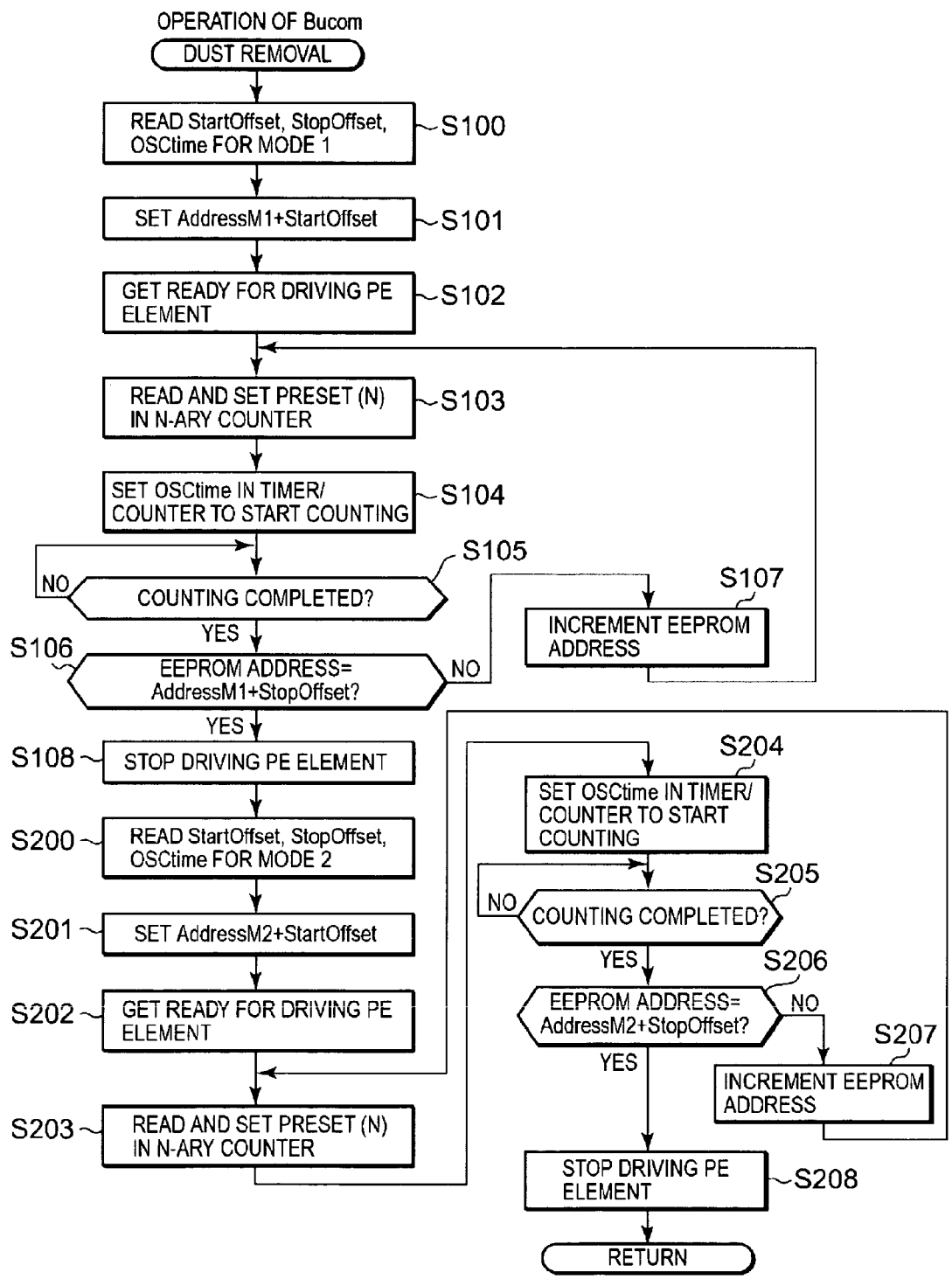
FIG. 9 is a flowchart showing the detailed procedure of a sub-routine "dust removal operation" in the flowchart of FIG. 6.

In the sub-routine "dust removal operation" shown in FIG. 9, the piezoelectric element 322 is driven to resonate the dust reduction glass 321 in two modes, namely the vibration mode 1 and the vibration mode 2. In general, the frequency and amplitude of vibration for removing dust vary depending on the properties of dust (for example, weight, shape, material, etc.). In order to ensure the removal of dust, it is preferable to resonate the glass plate in the two modes. Of course, it can be configured so that the glass plate can be resonated in more than two modes. However, since the time required for removal operation becomes longer as the number of vibration modes increases, an appropriate number of vibration modes should be set with due consideration given to the degree of the removal effect and the time required.

Figure 10:
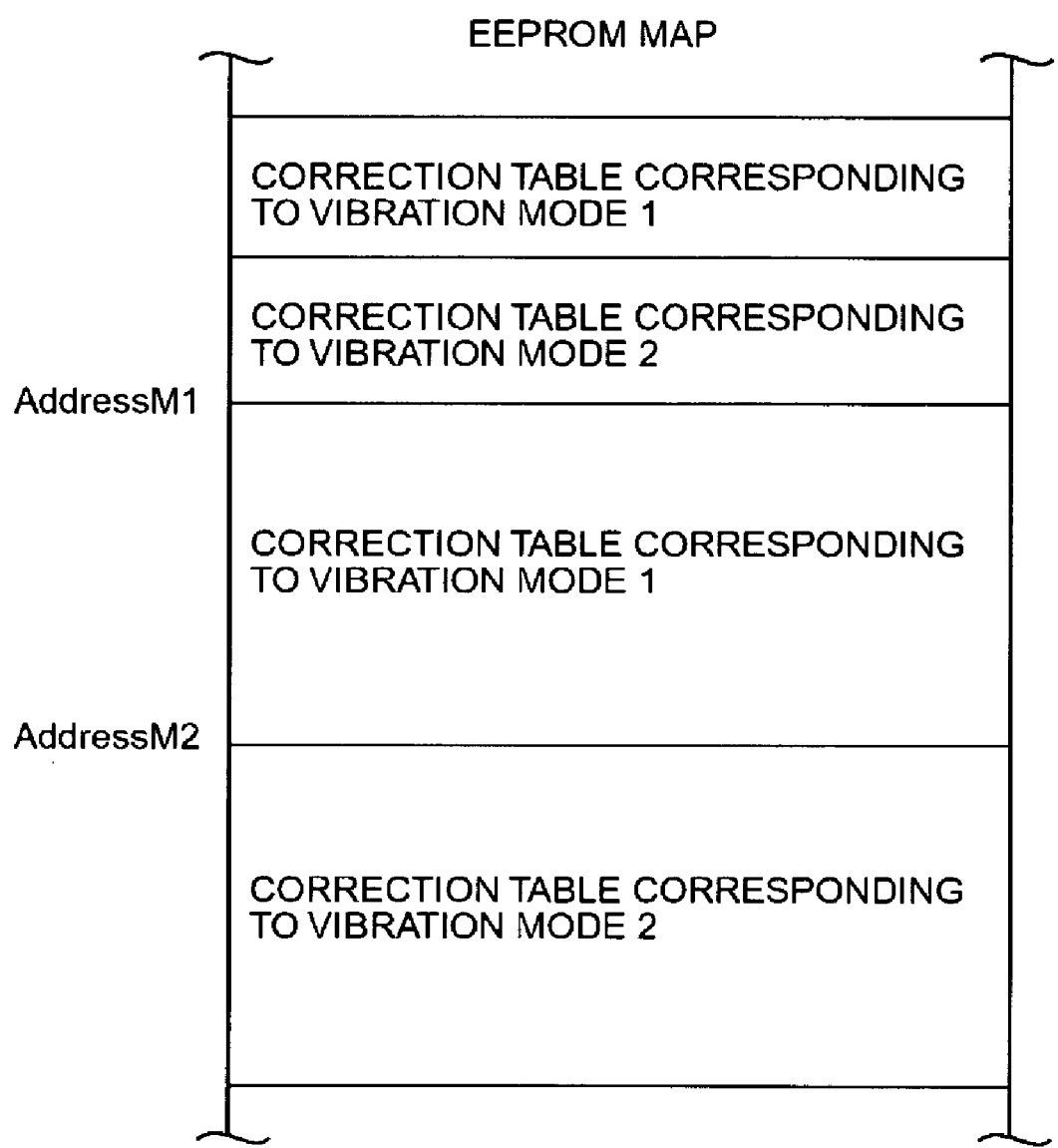
FIG. 10 is a memory map showing table areas related to correction in an EEPROM.

The following describes the sub-routine "dust removal operation" described in step S002 and step S009 of the flowchart in FIG. 6 with reference to the flowcharts of FIG. 9 and FIGS. 10 to 13. First, in step S100, three control parameters (StartOffset, StopOffset, OSCtime) are read from the EEPROM 29. The three control parameters can be read from a "temperature correction table corresponding to vibration mode 1" stored in the EEPROM 29 as shown in FIG. 10 illustrating a memory map of the EEPROM 29.

FIG. 11A shows the details of the temperature correction table corresponding to vibration mode 1. Temperature information (t) is indispensable to read the corresponding control parameters from the temperature correction table. The temperature information (t) is detected by and acquired from a temperature sensor of the thermometric circuit 33 before execution of the sub-routine (see step S001 or S008 in FIG. 6).

Assuming that the temperature information (t) is 20° C., the control parameters in this case are read from the portion indicated by *0 in the temperature correction table corresponding to vibration mode 1 in FIG. 11A. In other words, a reading start position (StartOffset) of "3," a reading stop position (StopOffset) of "14," and a time interval (OSCtime) of "100" are obtained. Then, based on the "StartOffset" value and the "StopOffset" value, the area of a frequency correction table corresponding to vibration mode 1 in the EEPROM 29 is defined. Further, the preset values are read from the area and set in the N-ary counter 41 sequentially at time intervals (of 100 msec. in this case).

FIGS. 12A and 12B show frequency correction tables corresponding to these vibration modes. FIG. 12A is a frequency correction table corresponding to vibration mode 1, and FIG. 12B is a frequency correction table corresponding to vibration mode 2. The frequency correction table corresponding to vibration mode 1 is defined as being calculated on condition that the clock generator 55 outputs a pulse signal having a frequency of 40 MHz.

Figure 13:
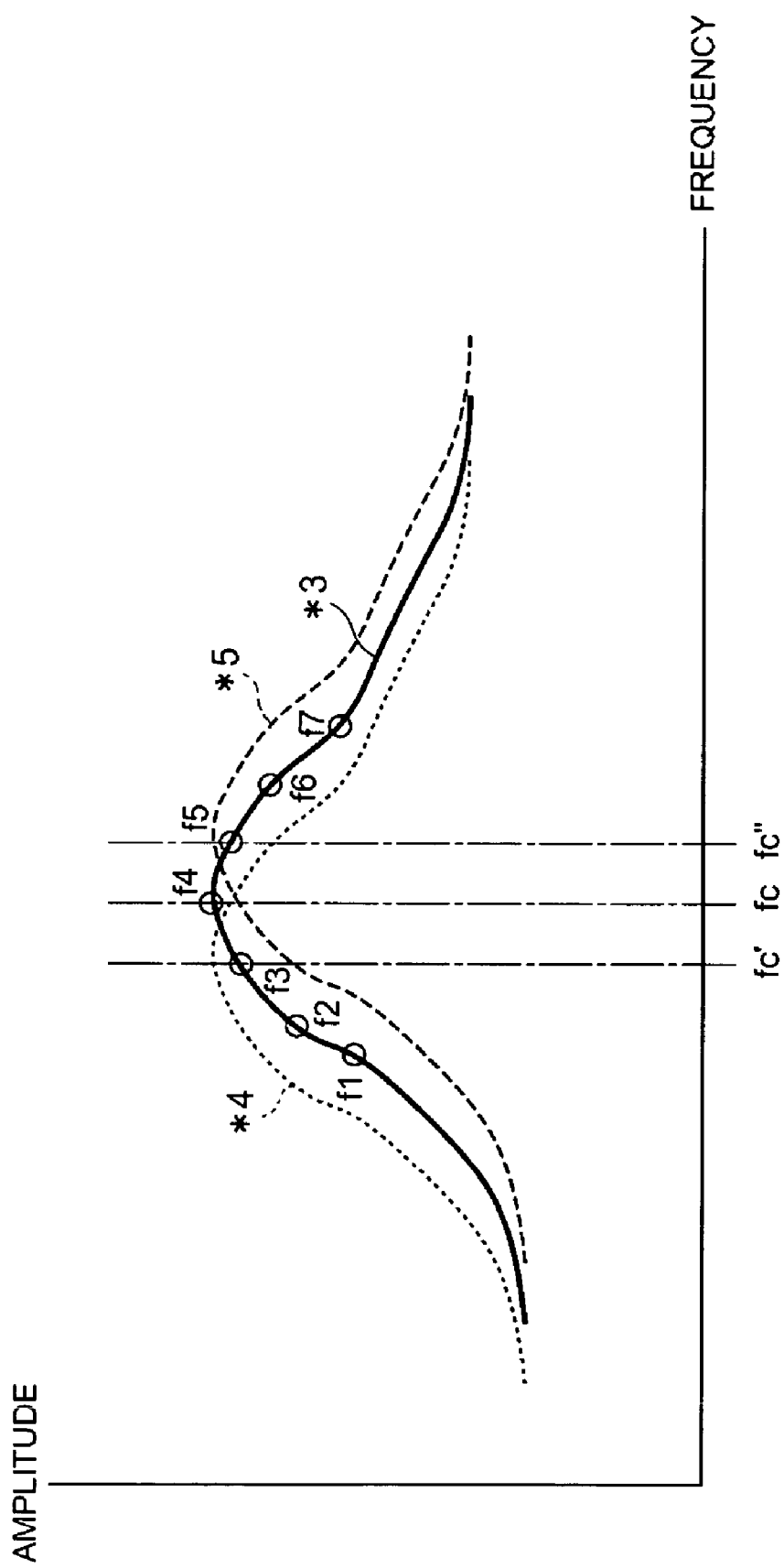
FIG. 13 is a characteristic graph showing the relationship between driving frequency and amplitude of vibration of each glass plate.

The driving frequency can be determined using the above-described equation 1). Then, based on the values read from the above-mentioned temperature correction table, the preset values in the frequency correction table corresponding to vibration mode 1 are set sequentially in the N-ary counter 41. When the temperature information is 20° C., 12 present values in areas of *1 to *2' are set sequentially in the N-ary counter 41 based on the values of the control parameters (StartOffset=3, StopOffset=14) read from the temperature correction table corresponding to vibration mode 1 in FIG. 11A. However, for the sake of simplifying the description, only the dust reduction glass 321 is considered. In other words, the following describes a case where seven preset values in areas of *1 to *2 in FIG. 12A are set sequentially. In the graph of FIG. 13, a curve *3 indicates a case where the relationship between the driving frequency f1, f2, . . . , f7 and the amplitude of the glass plate vibration is plotted.

In the graph of FIG. 13, characteristic curves indicate the relationship between driving frequency fn and amplitude of vibration of the glass plate, with a correction range of resonance frequencies (fc'<fc<fc") plotted along the curve *3. In the curve *3, fc is the resonance frequency, which is equal to f4 accidentally. For example, the resonance frequency of a glass plate having a characteristic curve *4 is fc', which is equal to f3. On the other hand, the resonance frequency of a glass plate having a characteristic curve *5 is fc", which is equal to f5.

Thus, if the reading start position (StartOffset) and the reading stop position (Stopoffset) of the frequency correction table are set by taking into account variations of resonance frequencies in a predetermined range Δfc, the glass plate can be shaken to vibrate at the resonance frequency or near the resonance frequency. Further, it is obvious that, even if Δfc varies with temperature, the glass plate can be driven at the resonance frequency on condition that the temperature correction table corresponding to vibration mode 1 shown in FIG. 11A is set properly.

In the above description, the dust reduction glass 321 is taken as an example, but the dust reduction glasses 321, 323, and 325 are different in size because of different optical or acceptable sizes required. For example, the finder CCD unit 309 generally has a small-size image pickup device, compared to a large-size image pickup device in the CCD unit 303, because such a large-size image pickup device is not needed for the function of the finer. On the other hand, although the AF sensor unit 313 has recently become large due to the expanded functions of the digital camera such as the adoption of multiple AF points, the optical size of the light receiving portion is still smaller than those of the CCD unit 303 and the finder CCD unit 309.

Thus, the optical sizes different from one another. Further, the finder system and the AF system are required to be more compact than the imaging system because of their limited mounting space. These are why the dust reduction glasses 321, 323, and 325 have different sizes.

Figure 14A:
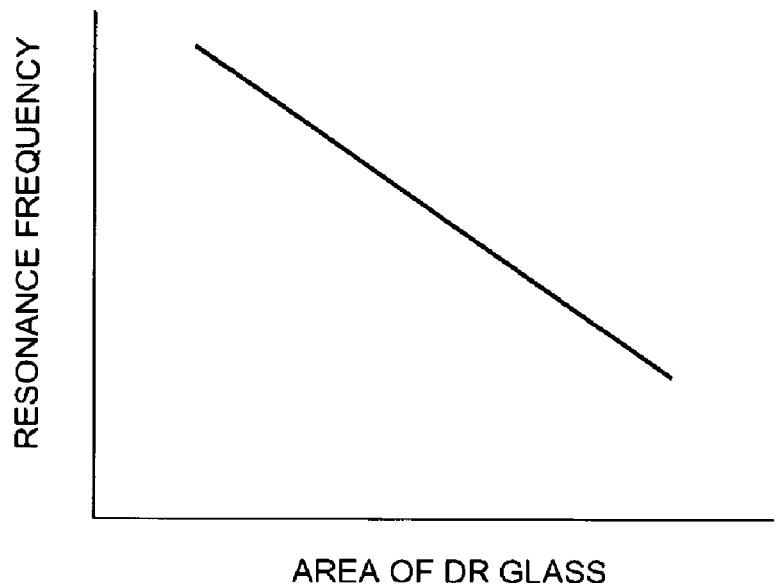
FIG. 14A is a graph showing the relationship the area of a dust reduction glass and resonance frequency.
Figure 14B:
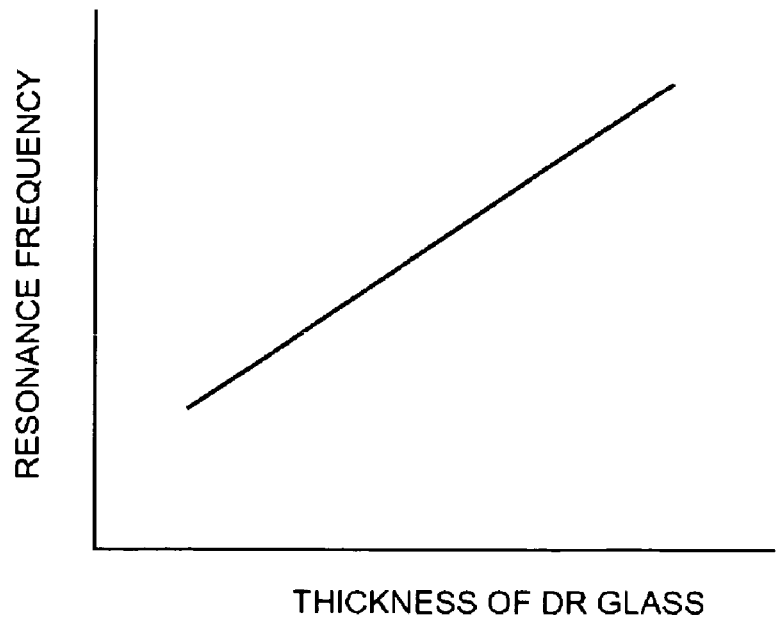
FIG. 14B is a graph showing the relationship the thickness of the dust reduction glass and resonance frequency.

Because the dust reduction glasses 321, 323, and 325 have different sizes, their resonance frequencies are basically different. FIG. 14A is a graph showing the relationship between the area of dust reduction glass and its resonance frequency, while FIG. 14B is a graph showing the relationship between the thickness of the dust reduction glass and its resonance frequency. In general, the resonance frequency of a dust reduction glass is roughly in reverse proportion to the area and in proportion to the thickness.

Therefore, it can be considered that the areas and thicknesses of the dust reduction glasses 321, 323, and 325 are adjusted to set the same resonance frequency. In this case, the adjustments have limitations because they could result in mounting space and crack problems. Nevertheless, adjusting the areas and thicknesses of these dust reduction glasses 321, 323, and 325 in an allowable range to set their resonance frequencies as close as possible is effective because a common driving frequency range can be scanned to drive the dust reduction glasses 321, 323, and 325 in a manner to be described later.

As discussed above, in order to obtain the optimum vibration of each of the dust reduction glasses 321, 323, and 325, it is necessary to set the optimum driving frequency for each of the dust reduction glasses 321, 323, and 325 so that sufficient vibration can be obtained. Therefore, in the first embodiment, the dust-reduction glass driving circuit 332 changes the driving frequency under the control of the Bucom 333 depending on the resonance frequency of each of the dust reduction glasses 321, 323, and 325 to drive the dust reduction glasses 321, 323, and 325 to obtain the optimum vibration, respectively.

Figure 15:
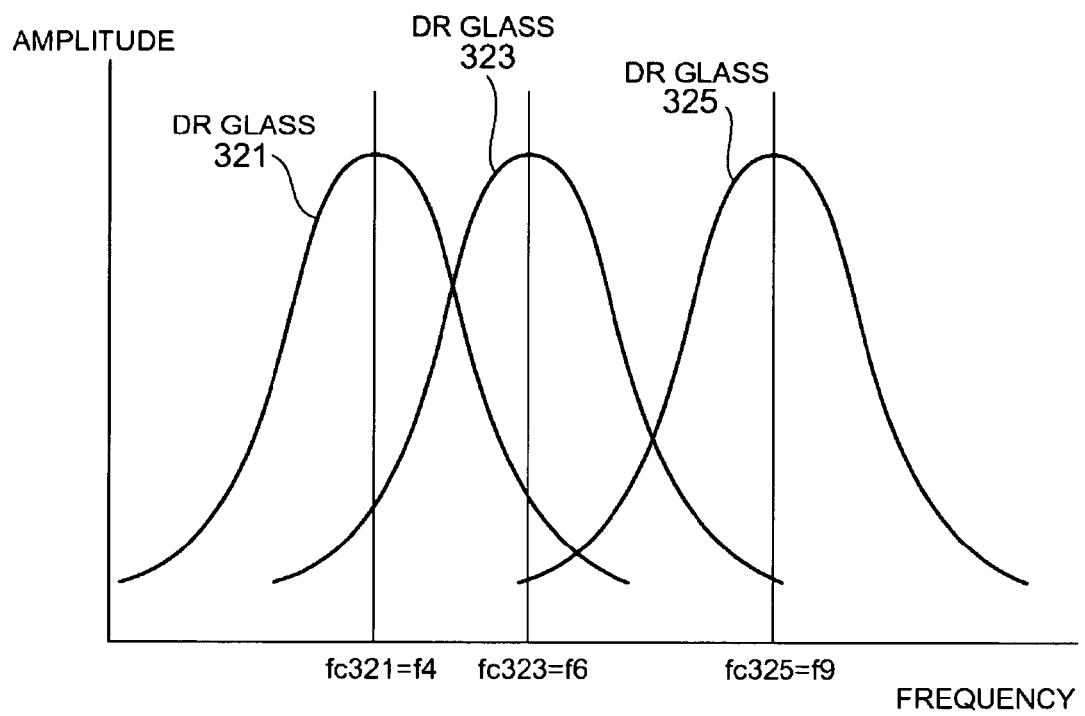
FIG. 15 is a characteristic graph showing the relationship between driving frequency and amplitude of vibration for each of dust reduction glasses.

FIG. 15 is a graph in which each of characteristic curves indicates the relationship between the driving frequency and the amplitude of each of the dust reduction glasses 321, 323, and 325. Since the characteristics of the dust reduction glasses 321, 323, and 325 are different from one another depending on the size and shape of each glass plate, their resonance frequencies fc 321, fc 323, and fc 325 are also different from one another. Therefore, it is desirable to drive each of the dust reduction glasses 321, 323, and 325 at each corresponding resonance frequency fc 321, fc 323, or fc 325 so as to obtain the optimum amplitude of vibration with a fairly high degree of dust reduction effectiveness.

As discussed above, when considering only the dust reduction glass 321, the driving frequency of the dust-reduction glass driving circuit 332 falls within the range of f1 to f7 including fc 321=f4 as indicated in the range of *1 to *2 in FIG. 12A. On the other hand, when considering all the resonance frequencies of the dust reduction glasses 321, 323, and 325, the dust-reduction glass driving circuit 332 is controlled to drive the dust reduction glasses 321, 323, and 325 in the predetermined frequency range of f1 to f12 including these different resonance frequencies fc 321, fc 323, and fc 325 as indicated in the range of *1 to *2' in FIG. 12A.

Returning to the flowchart of FIG. 9, the value of OSCtime can be set larger to change the vibration exciting time (duration) of each glass plate in the resonant state to any desired time (duration). In this case, however, time for needless excitation operation (driving at frequencies other than each resonance frequency) also increases. Therefore, in step S101, AddressM1+StartOffset is set as the reading start address of the EEPROM 29. AddressM1 means the starting address of the frequency correction table corresponding to vibration mode 1. In other words, AddressM1+StartOffset corresponds to *1 in FIG. 12A. Here, the resonance frequencies of the dust reduction glasses 321, 323, and 325 are set to fc 321=f4, fc 323=f6, fc 325=f9, respectively.

Then, in step S102, preliminary operations for driving the piezoelectric elements 322, 324, and 326 are performed. In other words, P_PwCont of the IO port is controlled to turn on the transistor (Q00)44a. Then, the output of a pulse signal from the clock generator 55 is started. In this state, data acquired from the table is set in the N-ary counter 41, enabling the piezoelectric elements 322, 324, and 326 to be driven at desired frequencies, respectively.

In step S103, the preset value (N) is read from the set address. Then, the preset value read is sent from D_NCnt of the IO port and set in the N-ary counter 41. In step S104, OSCtime is set in a timer/counter to start timer counting.

Then, in step S105, the procedure waits until the timer/counter completes counting. In step S106, it is determined whether the address of the EEPROM 29 is "AddressM1+StopOffset." If YES in step S106, it means that table data up to *2' in FIG. 12A are read. In other words, it means that the excitation operations on scheduled frequencies are completed. Therefore, in this case, the driving operation is stopped in step S108. Specifically, the transistor (Q00)44a is turned off to stop the operation of the clock generator 55.

When the procedure proceeds from step S106 to step S107, the address of the EEPROM 29 is incremented by one (+1).

Then, the procedure returns to step S103 to drive the piezoelectric elements 322, 324, and 326 at next frequencies.

Thus, since the frequencies are changed from *1(f1) to *2'(f12) as shown in FIG. 12A, the driving frequencies are changed to drive the dust reduction glasses 321, 323, and 325 in the range including all the resonance frequencies fc 321=f4, fc 323=f6, and fc 325=f9. In this case, if the resonance frequencies fc 321, fc 323, and fc 325 can be made equal or close to one another, the scanning range of frequencies can also be narrowed. If the assumption is made that the driving duration with each frequency and the frequency change step are fixed, the driving duration for dust removal can be reduced, thereby reducing the operation time lag in the apparatus and hence enhancing responsiveness.

Upon completion of the driving operation corresponding to the vibration mode 1, steps S200 to S208 are executed for driving operation corresponding to the vibration mode 2. The control parameters, namely StartOffset, StopOffset, and OSCtime, required to excite or shake the glass plate to vibrate in the vibration mode 2 are read from the temperature correction table corresponding to vibration mode 2 stored in the EEPROM 29 and shown in FIG. 11B. Then, the preset value (N) is read from the frequency correction table corresponding to vibration mode 2 stored in the EEPROM 29. Like in the vibration mode 1, the details of the frequency correction table corresponding to vibration mode 2 is shown in FIG. 12B.

The following steps S200 to S 208 are basically the same as steps S100 to S108 mentioned above. Since only a different point is that the address of the EEPROM 29 to read a table required for the control operation is different from that in steps S100 to S108, the description is omitted.

Thus, upon completion of the operation for exciting or shaking the dust reduction glasses 321, 323, and 325 in the two vibration modes, namely the vibration mode 1 and the vibration mode 2, the procedure returns to the main routine.

Note that it is difficult to estimate the variations in the resonance frequency of each glass plate at the design stage of the camera system. Therefore, it is preferable that the control parameters for determining the driving frequency for each of the piezoelectric elements 322, 324, and 326 be set after the camera system is complete. In the first embodiment, necessary parameters are selectably stored in the EEPROM 29 as mentioned above.

Thus, according to the first embodiment, the optical apparatus with dust reduction capability has the CCD unit 303 for photoelectric conversion of a subject image, the dust reduction glass 321 arranged between the CCD unit 303 and the taking lens 301, and the piezoelectric element 322 for vibrating the dust reduction glass 321 at predetermined frequencies. The CCD unit 303 is preferably housed in a case-like frame integrally with the other components. The optical apparatus also has the finder CCD unit 309 for photoelectric conversion of the subject image, the dust reduction glass 323 arranged in front of the finder CCD unit 309, and the piezoelectric element 324 for vibrating the dust reduction glass 323 at predetermined frequencies. The finder CCD unit 309 is preferably housed in a case-like frame integrally with the other components. Further, the optical apparatus has the AF sensor unit 313 for photoelectric conversion of the subject image, the dust reduction glass 325 arranged in front of the AF sensor unit 313, and the piezoelectric element 326 for vibrating the dust reduction glass 325 at predetermined frequencies. Then, when driving the piezoelectric elements 322, 324, and 326 to vibrate the dust reduction glasses 321, 323, and 325, the dust-reduction glass driving circuit 332 is controlled to change the frequencies of vibration sequentially. The frequency changing range includes the resonance frequencies of the dust reduction glasses 321, 323, and 325. This allows the surfaces of the dust reduction glasses 321, 323, and 325 to vibrate repeatedly in such a state that they are in phase or 180° out of phase with each other, thereby removing dust from each glass surface.

Since the optical apparatus is configured such above, a camera system capable of removing dust efficiently can be provided with consideration given only to the ambient temperature measured, without considering the other factors, such as variations in glass shape or elastic coefficient, which also affects the resonance frequencies of the dust reduction glasses 321, 323, and 325 as cover glasses. The embodiment also eliminates the need for the time and cost of adjusting the natural resonance frequency of each of the cover glasses made of a glass material that vary from piece to piece so that the resonance frequency of each piece of glass cover cannot be identified.

Second Embodiment

The following describes a second embodiment of the present invention. In summary, in the second embodiment, the drive control section 331 selectively drives each of the piezoelectric elements 322, 324, and 326 to vibrate each of the dust reduction glasses 321, 323, and 325 in a time-sharing manner. Particularly, the second embodiment assumes a case where each of the dust reduction glasses 321, 323, and 325 has a different resonance frequency as indicated by fc 321, fc 323, or fc 325, respectively. In operation, the drive control section 331 selectively drives each of the piezoelectric elements 322, 324, and 326 to scan a predetermined frequency range including the resonance frequency of each of the dust reduction glasses 321, 323, and 325 so as to vibrate each of the dust reduction glasses 321, 323, and 325 in a time-sharing manner. For example, the driving frequency is so changed that the dust reduction glass 321 will be driven only for a period during which the driving frequency lies close to the resonance frequency fc 321 of the dust reduction glass 321. Similarly, the dust reduction glass 323 is driven only for a period during which the driving frequency lies close to the resonance frequency fc 323 of the dust reduction glass 323. Further, the dust reduction glass 325 is driven only for a period during which the driving frequency lies close to the resonance frequency fc 325 of the dust reduction glass 325. Thus, the dust reduction glass to be driven is switched according to the change in the driving frequency.

Figure 16:
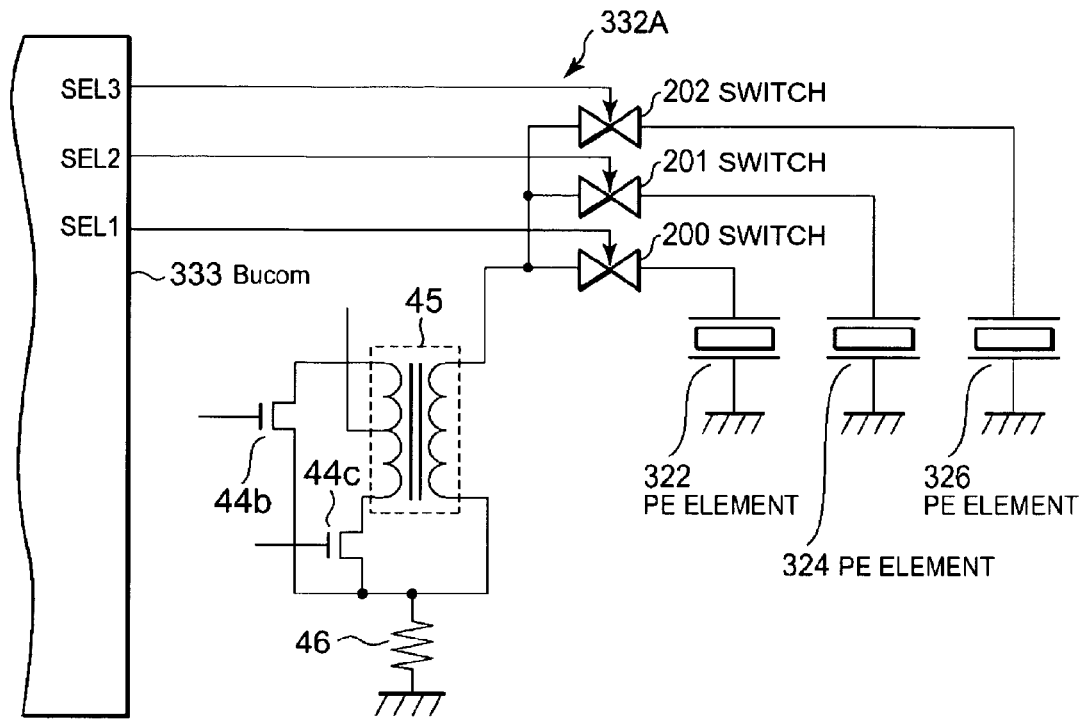
FIG. 16 is a schematic circuit diagram showing an exemplary structure of a dust-reduction glass driving circuit according to a second embodiment of the present invention.

FIG. 16 is a schematic circuit diagram showing an exemplary structure of a dust-reduction glass driving circuit 332A according to the second embodiment of the present invention. The following describes only different parts from those in FIG. 3. In the second embodiment, the dust-reduction glass driving circuit 332A is provided with switches 200, 201, and 202, or MOSFETs, as switching circuits arranged between the secondary side of the transformer 45 and each of the piezoelectric element 322, 324, and 326, for selectively driving the piezoelectric element 322, 324, and 326, respectively. These switches 200, 201, and 202 are turned on or off in response to the select signals SEL 1 to SEL 3 from the Bucom 333. For example, when the select signal SEL 1 is at an H level, the corresponding switch 200 is turned on to connect the secondary side of the transformer 45 to the piezoelectric element 322 (to make the piezoelectric element 322 ready to be driven). On the other hand, when the select signal SEL 1 is at an L level, the corresponding switch 200 is turned off to disconnect the secondary side of the transformer 45 from the piezoelectric element 322 (to disable the piezoelectric element 322 from being driven). The select signals SEL 2 and SEL 3 work in the same manner.

Figure 17:
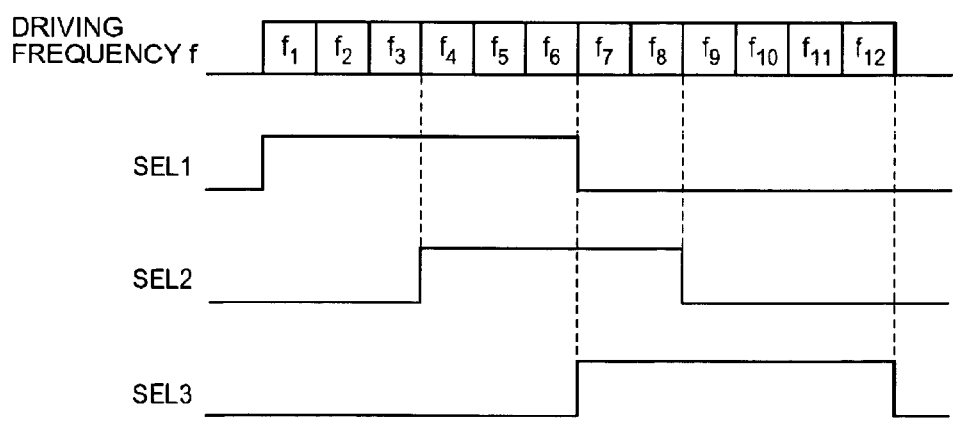
FIG. 17 is a time chart showing an operation control example.

FIG. 17 is a time chart showing an example of control operation in the structure shown in FIG. 16. In summary, in the second embodiment, the driving frequency f is changed under the control of the Bucom 333 to scan a predetermined frequency range. Then, the H/L level of each of the select signals SEL 1 to SEL 3 is switched according to the change in the driving frequency f to turn on a corresponding switch 200, 201, or 202 selectively only for a period during which the driving frequency is effective. This allows the output of the secondary side of the transformer 45 to be supplied to the corresponding piezoelectric element 322, 324 or 326. Thus, only the piezoelectric element on which the driving frequency has an effect is driven at each time point.

In the scanning range of driving frequencies f1 to f6 including the resonance frequency f4 of the dust reduction glass 321, the signal SEL 1 is at the H level to turn the switch 200 on, so that the output of the secondary side of the transformer 45 is supplied to the piezoelectric element 322, thereby driving the piezoelectric element 322. In this case, the select signal SEL 2 is off in the range of driving frequencies f1 to f3 that do not affect the piezoelectric element 324 so that the output of the secondary side of the transformer 45 will not be supplied to the piezoelectric element 324. Similarly, the signal SEL 3 is off in the overall range of driving frequencies f1~f6 that do not affect the piezoelectric element 326 so that the output of the secondary side of the transformer 45 will not be supplied to the piezoelectric element 326. On the other hand, the select signal SEL 1 is at the L level in the scanning range of driving frequencies f7 to f12 to turn the switch 200 off so that the output of the secondary side of the transformer 45 will not be supplied to the piezoelectric element 322.

Further, in the scanning range of driving frequencies f4 to f8 including the resonance frequency f6 of the dust reduction glass 323, the select signal SEL 2 is at the H level to turn the switch 201 on, so that the output of the secondary side of the transformer 45 is supplied to the piezoelectric element 324, thereby driving the piezoelectric element 324. In the other scanning ranges of driving frequencies f1 to f3 and f9 to f12, the select signal SEL 2 is at the L level to turn the switch 201 off so that the output of the secondary side of the transformer 45 will not be supplied to the piezoelectric element 324.

Similarly, in the scanning range of driving frequencies f7 to f12 including the resonance frequency f9 of the dust reduction glass 325, the select signal SEL 3 is at the H level to turn the switch 202 on, so that the output of the secondary side of the transformer 45 is supplied to the piezoelectric element 326, thereby driving the piezoelectric element 326. In the other scanning range of driving frequencies f1 to f6, as mentioned above, the select signal SEL 3 is at the L level to turn the switch 202 off so that the output of the secondary side of the transformer 45 will not be supplied to the piezoelectric element 326.

Thus, according to the second embodiment, the drive control section 331 selectively drives each of the piezoelectric elements 322, 324, and 326 to scan a predetermined frequency range including the resonance frequency of each of the dust reduction glasses 321, 323, and 325 so as to vibrate each of the dust reduction glasses 321, 323, and 325 in a time-sharing manner. This makes it possible to reduce the wasted power consumed when each piezoelectric element is driven at driving frequencies from which vibration for effective dust reduction cannot be obtained, and hence to reduce battery consumption. Particularly, in the second embodiment, since the resonance frequencies fc 321, fc 323, fc 325 of the dust reduction glasses 321, 323, and 325 are different from one another, the differences among the resonance frequencies can be used to allow the signal dust-reduction glass driving circuit 332A to switch the scanning ranges sequentially and drive the plural piezoelectric elements 322, 324, and 326 selectively and efficiently.

Third Embodiment

The following describes a third embodiment of the present invention. The description of the third embodiment focuses on the point that the vibration exciting element is the piezoelectric element. In summary, each of the piezoelectric elements 322, 324, and 326 is applied with a voltage varying from element to element. In other words, the applied voltage is used as an optimum parameter for each of the piezoelectric elements 322, 324, and 326 to vibrate each of the dust reduction glasses 321, 323, and 325, so that the applied voltage is switched to vibrate each of the dust reduction glass 321, 323, and 325 for dust reduction operation.

Figure 18:
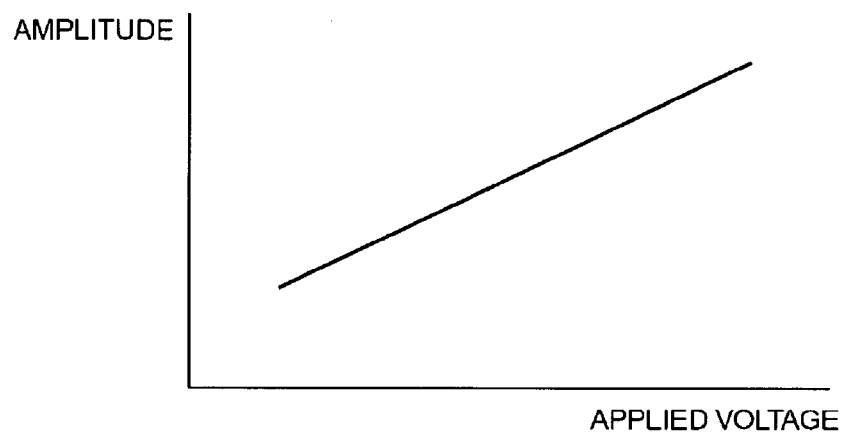
FIG. 18 is a graph showing the relationship between applied voltage to each piezoelectric element and amplitude.

As mentioned above, since the piezoelectric element 322, 324, 326 are different in size, shape, and usage, they are different in dust removal performance required, that is, in the amplitude of vibration. One of methods for adjusting the amplitude is a method of changing the applied voltage to each piezoelectric element. FIG. 18 is a graph showing the relationship between the applied voltage to a piezoelectric element and the amplitude, indicating that the vibration amplitude of the piezoelectric element increases in proportion to the applied voltage.

Thus, the applied voltage can be increased to make the vibration amplitude larger. However, if a voltage of a predetermined value or more determined by the size, shape, or the like is applied to each of the piezoelectric elements 322, 324, and 326, the piezoelectric element could be broken down. Therefore, an unnecessarily large voltage should not be applied to the piezoelectric element. This could also brake each of the dust reduction glasses 321, 323, 325 due to too large vibration.

Figure 19:
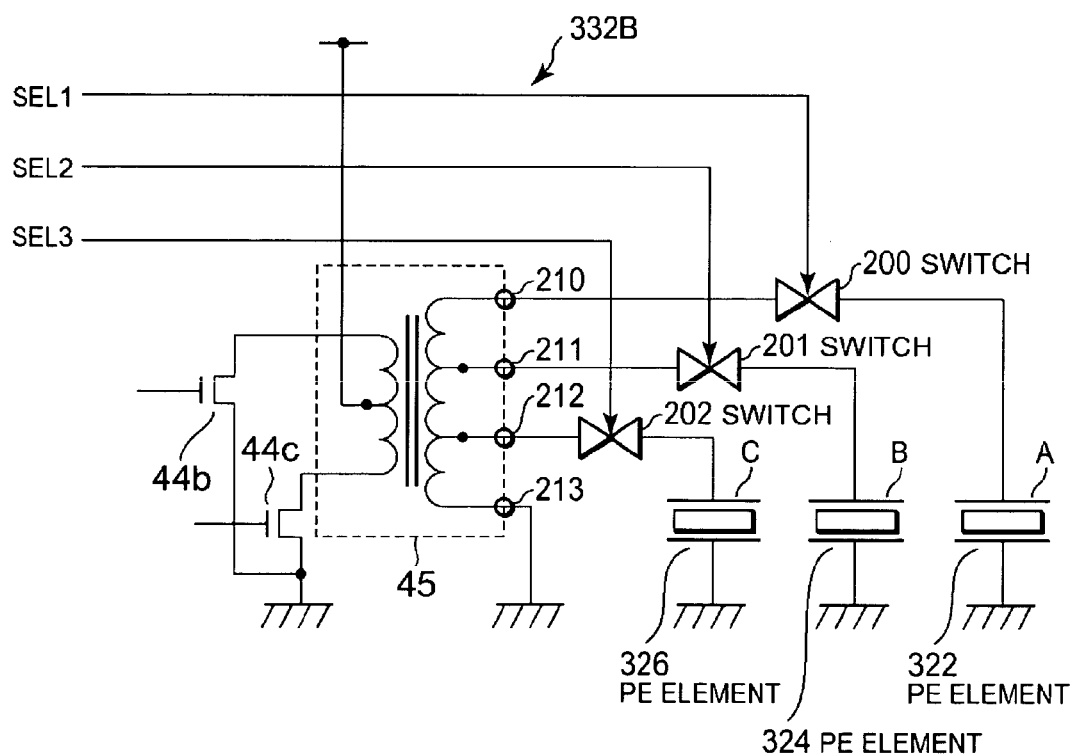
FIG. 19 is a schematic circuit diagram showing an exemplary structure of a dust-reduction glass driving circuit according to a third embodiment of the present invention.

FIG. 19 is a schematic circuit diagram showing an exemplary structure of a dust-reduction glass driving circuit 332B according to the third embodiment of the present invention. The following describes only different parts from those in FIG. 3. In the third embodiment, the dust-reduction glass driving circuit 332B is provided with intermediate terminals 211 and 212 that divide between both terminals 210 and 213 of the secondary winding of the transformer 45, forming an applied voltage varying circuit. In other words, the output terminal 210 and the intermediate terminals 211, 212 can vary the output voltage in three steps.

The output terminal 210 with the highest output voltage is connected to the piezoelectric element 321 through the switch 200. The intermediate terminal 211 with the next highest voltage is connected to the piezoelectric element 323 through the switch 201. The intermediate terminal 212 with the lowest output voltage is connected to the piezoelectric element 325 through the switch 202.

In other words, in the third embodiment, the secondary side of the transformer 45 is configured to have different winding ratios to change the step-up ratios and hence vary the voltage to be supplied to the piezoelectric element side. Assuming that the winding ratio between the secondary winding terminals 210 and 213 is K1 and the winding ratio between the terminals 211 and 213 is K2, the relationship between the winding ratios is K1>K2. Therefore, since the use of the output terminal 210 realizes a higher step-up ratio than the use of the intermediate terminal 211, the applied voltage to the piezoelectric element 322 becomes higher than that to the piezoelectric element 324. Assuming further that the winding ratio between the terminals 212 and 213 is K3, the relationship among the winding ratios is K3<K2<K1. Therefore, since the use of the intermediate terminal 212 realizes a lower step-up ratio than the use of the intermediate terminal 211, the applied voltage to the piezoelectric element 326 becomes lower than that to the piezoelectric element 324.

Figure 20:
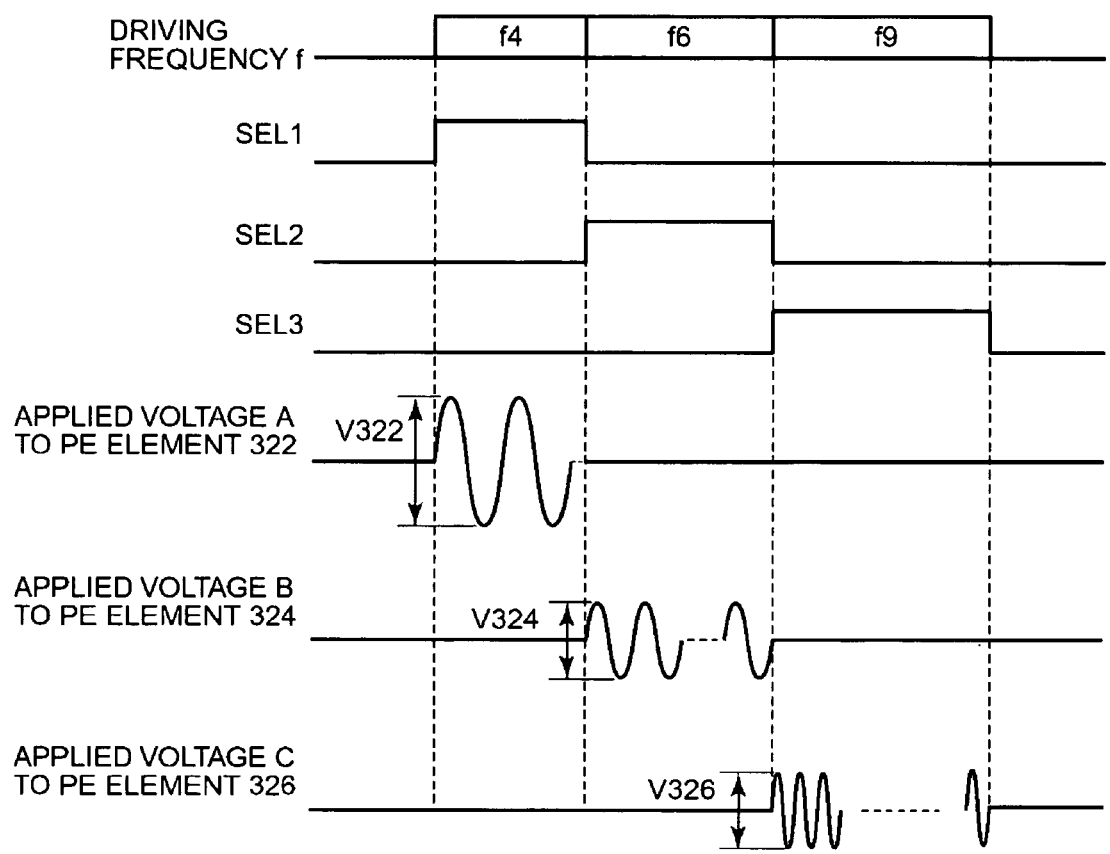
FIG. 20 is a time chart showing an operation control example.

FIG. 20 is a time chart showing exemplary operation control performed by the structure shown in FIG. 19. In FIG. 20, the driving frequencies f are set to three different resonance frequencies f4, f6, and f9 of the dust reduction glasses 321, 323, and 325, respectively.

The operation is started with the driving frequency f4 to change the select signal SEL 1 to H level (L level for SEL 2 and SEL 3), turn the switch 200 on, and supply secondary output voltage A of the transformer 45 to the piezoelectric element 322. In this case, the amplitude of the applied voltage A to the piezoelectric element 322 is V 322. Then, the operation is performed at the driving frequency f6 to change the select signal SEL 2 to the H level (L level for SEL 1 and SEL 3), turn the switch 201 on, and supply secondary output voltage B of the transformer 45 to the piezoelectric element 324. In this case, the amplitude of the applied voltage B to the piezoelectric element 324 is V 324. The amplitude V 324 is smaller than the amplitude V 322 because of the difference in the winding ratio of the transformer 45.

Further, the operation is performed at the driving frequency f9 to change the select signal SEL 3 to H level (L level for SEL 1 and SEL 2), turn the switch 202 on, and supply secondary output voltage C of the transformer 45 to the piezoelectric element 326. In this case, the amplitude of the applied voltage C to the piezoelectric element 326 is V 326. The amplitude V 326 is smaller than the amplitude V 324 because of the difference in the winding ratio of the transformer 45.

Thus, according to the third embodiment, the applied voltage to each of the piezoelectric elements 322, 324, and 326 can be set individually by selecting a corresponding secondary winding of the transformer. This enables the supply of voltage necessary for each of the piezoelectric elements 322, 324, and 326 to obtain more efficient vibration. Further, the structure of this embodiment is provided with the switches 200, 201, and 202 so that each of the piezoelectric elements 322, 324, and 326 can be driven selectively in a time-sharing manner, enabling efficient driving.

Figure 21:
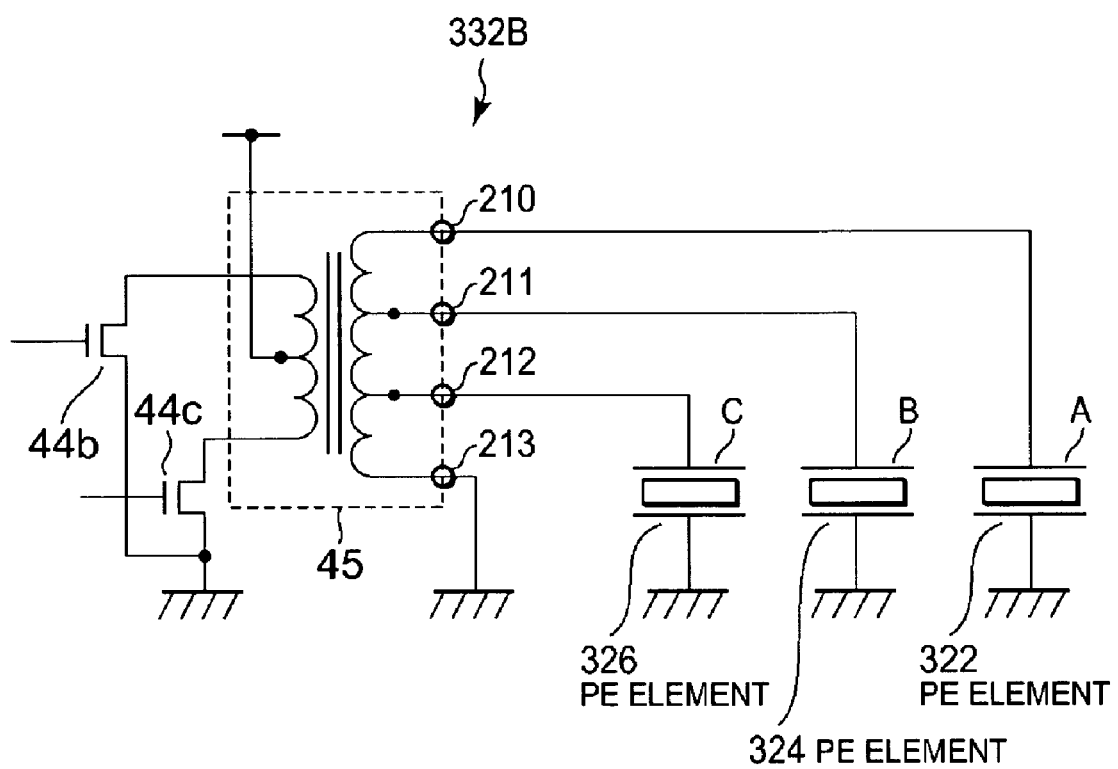
FIG. 21 is a schematic circuit diagram showing a modification example of the dust-reduction glass driving circuit.

FIG. 21 is a schematic circuit diagram showing a modification example. As shown in FIG. 21, the switches 200, 201, and 202 can be omitted so that the different voltages A, B, and C will be applied at the same time to drive the piezoelectric elements 322, 324, and 326, respectively, in the same manner as in the first embodiment.

Fourth Embodiment

The following describes a fourth embodiment of the present invention. The description of the fourth embodiment focuses on the point that the vibration exciting element is the piezoelectric element. In summary, like in the third embodiment, each of the piezoelectric elements 322, 324, and 326 is applied with a voltage varying from element to element. A different point from the third embodiment is that the primary side voltage of the transformer 45 is varied.

Figure 22:
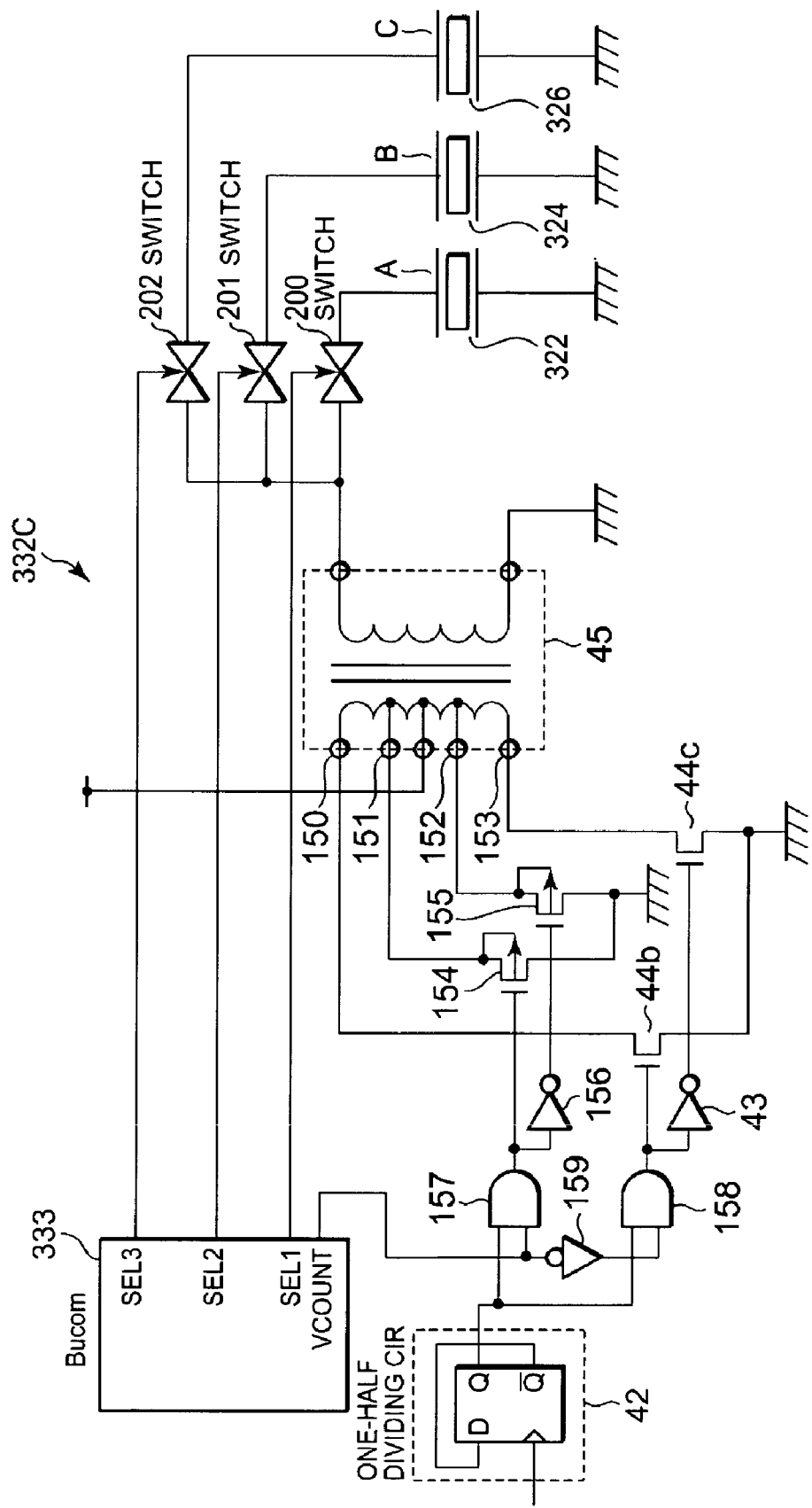
FIG. 22 is a schematic circuit diagram showing a dust-reduction glass driving circuit according to a fourth embodiment of the present invention.

FIG. 22 is a schematic circuit diagram showing a dust-reduction glass driving circuit 332C according to the fourth embodiment of the present invention. The following describes only different parts from those in FIG. 3. In the fourth embodiment, the dust-reduction glass driving circuit 332C is provided with intermediate terminals 151 and 152 that divide between both terminals 150 and 153 of the primary winding of the transformer 45. In this case, the transistors 44*b* and 44*c* can selectively drive each of the terminals 150 and 153, while transistors 154 and 155 can selectively drive each of the intermediate terminals 151 and 152, respectively. Such a circuit structure allows the dust-reduction glass driving circuit 332C to be configured as an applied voltage varying circuit. In other words, in the fourth embodiment, the primary side of the transformer 45 is configured to have different winding ratios to change the step-up ratios and hence vary the voltage to be supplied to the piezoelectric element side. Note that the secondary side connection of the transformer 45 is the same as that in FIG. 16.

In this case, the transistors 154 and 155 for the intermediate terminals 151 and 152 are driven by selectively supplying the output of the one-half dividing circuit 42 in response to a change in the VCONT signal of the Bucom 333 in the same manner as in the first embodiment. Note that the dust-reduction glass driving circuit 332C of the fourth embodiment has AND gates 157, 158, and an inverter 159 for selectively operating the side of the transistor 44*b* and 44*c* and the side of the transistors 154 and 155 in response to the VCONT signal.

Figure 23:
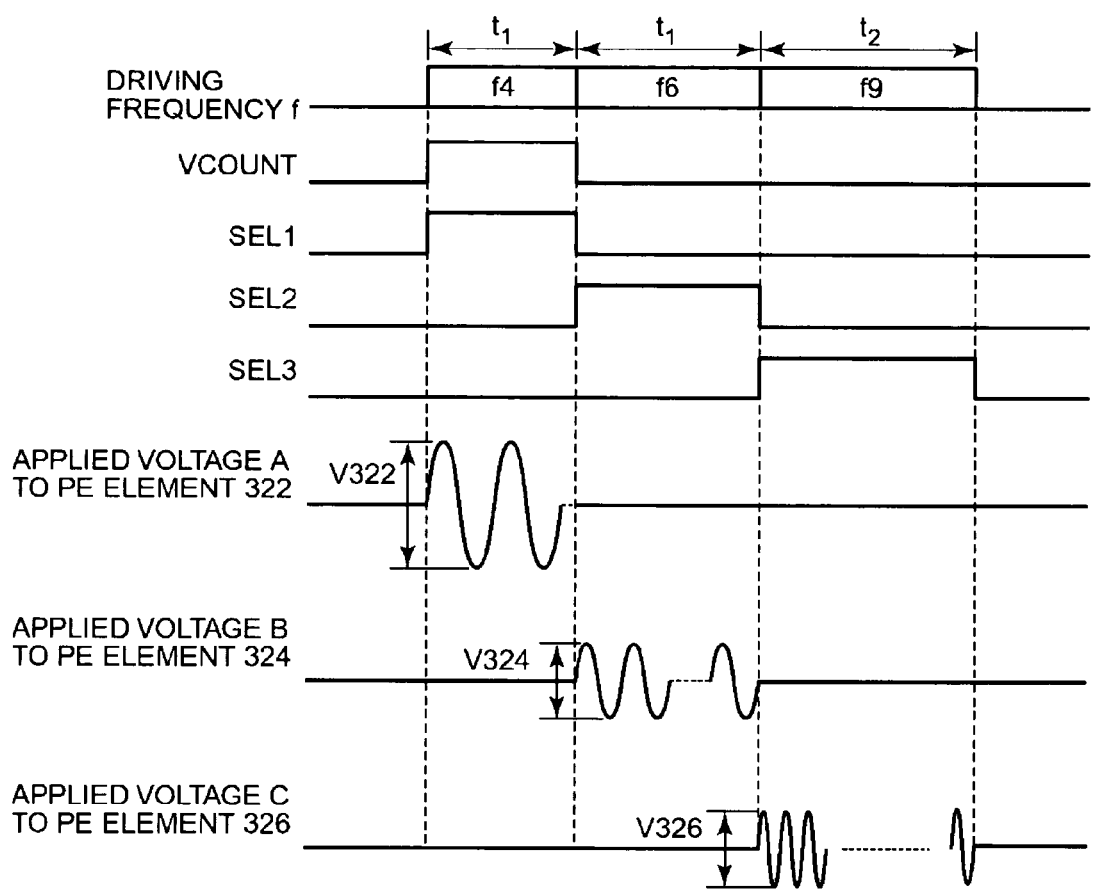
FIG. 23 is a time chart showing an operation control example.

FIG. 23 is a time chart showing exemplary operation control performed by the structure shown in FIG. 22. Like in the third embodiment, the driving frequencies f are set to three different resonance frequencies f4, f6, and f9 of the dust reduction glasses 321, 323, and 325, respectively.

The operation is started with the driving frequency f4. The Bucom 333 changes the VCONT signal to the H level to supply the output of the one-half dividing circuit 42 as the driving frequency f4 to the transistors 154, 155 through the AND gate 157 and an inverter 156. Further, it changes the select signal SEL 1 to the H level (and SEL 2 and SEL 3 to the L level), turns the switch 200 on, and supplies the primary output voltage A of the transformer 45 to the piezoelectric element 322. The Bucom 333 controls the operation at the driving frequency f4 to be performed for an operation period of t1. In this case, the amplitude V 322 of the applied voltage A to the piezoelectric element 322 takes a value according to the winding ratio determined by the primary winding and the secondary winding between the intermediate terminals 151 and 152 of the transformer 45.

Then, the operation is performed at the driving frequency f6. The Bucom 333 changes the VCONT signal to the L level, converts it to the H level at the inverter 159 to supply the output of the one-half dividing circuit 42 as the driving frequency f6 to the transistors 44*b*, 44*c* through the AND gate 158 and an inverter 43. Further, it changes the select signal SEL 2 to the H level (and SEL 1 and SEL 3 to the L level), turns the switch 201 on, and supplies the secondary output voltage B of the transformer 45 to the piezoelectric element 324. The Bucom 333 controls the operation at the driving frequency f6 to be performed during an operation period of t1. In this case, the amplitude V 324 of the applied voltage B to the piezoelectric element 324 takes a value according to the winding ratio determined by the primary winding and the secondary winding between the terminals 150 and 153 of the transformer 45, and the value becomes smaller than that of V 322.

Further, the operation is performed at the driving frequency f9. The Bucom 333 keeps the VCONT signal at the L level (converted to the H level at the inverter 159) to supply the output of the one-half dividing circuit 42 as the driving frequency f9 to the transistors 44*b*, 44*c* through the AND gate 158 and the inverter 43. Further, it changes the select signal SEL 3 to the H level (and SEL 1 and SEL 2 to the L level), turns the switch 202 on, and supplies the secondary output voltage C of the transformer 45 to the piezoelectric element 326. The Bucom 333 controls the operation at the driving frequency f9 to be performed for an operation period of t2 (where t2>t1). In this case, the amplitude V 326 of the applied voltage C to the piezoelectric element 326 takes a value according to the winding ratio determined by the primary winding and the secondary winding between the terminals 150 and 153 of the transformer 45, and the value becomes equal to the value of 324.

Thus, according to the fourth embodiment, the winding ratio of the primary winding of the transformer 45 is changed so that the applied voltage to each of the piezoelectric elements 322, 324, and 326 can be set individually. This enables the supply of voltage necessary for each of the piezoelectric elements 322, 324, and 326 to obtain more efficient vibration. Further, the structure of this embodiment is provided with the switches 200, 201, and 202 so that each of the piezoelectric elements 322, 324, and 326 can be driven selectively in a time-sharing manner, enabling efficient driving. Furthermore, the operation time is changed between t1 and t2 as required for each of the piezoelectric elements 322, 324, and 326 to control the vibration duration of each of the dust reduction glasses 321, 323, and 325 in a variable manner, thereby making it possible to improve dust removal performance. If the vibration duration is extended instead of increasing the applied voltage, effective dust removal can be realized.

Fifth Embodiment

The following describes a fifth embodiment of the present invention. The description of the fifth embodiment focuses on the point that the vibration exciting element is the piezoelectric element. In summary, like in the third and fourth embodiments, each of the piezoelectric elements 322, 324, and 326 is applied with a voltage varying from element to element. A different point from the third and fourth embodiments is that a constant voltage varying power supply is used to vary the applied voltage.

Figure 24:
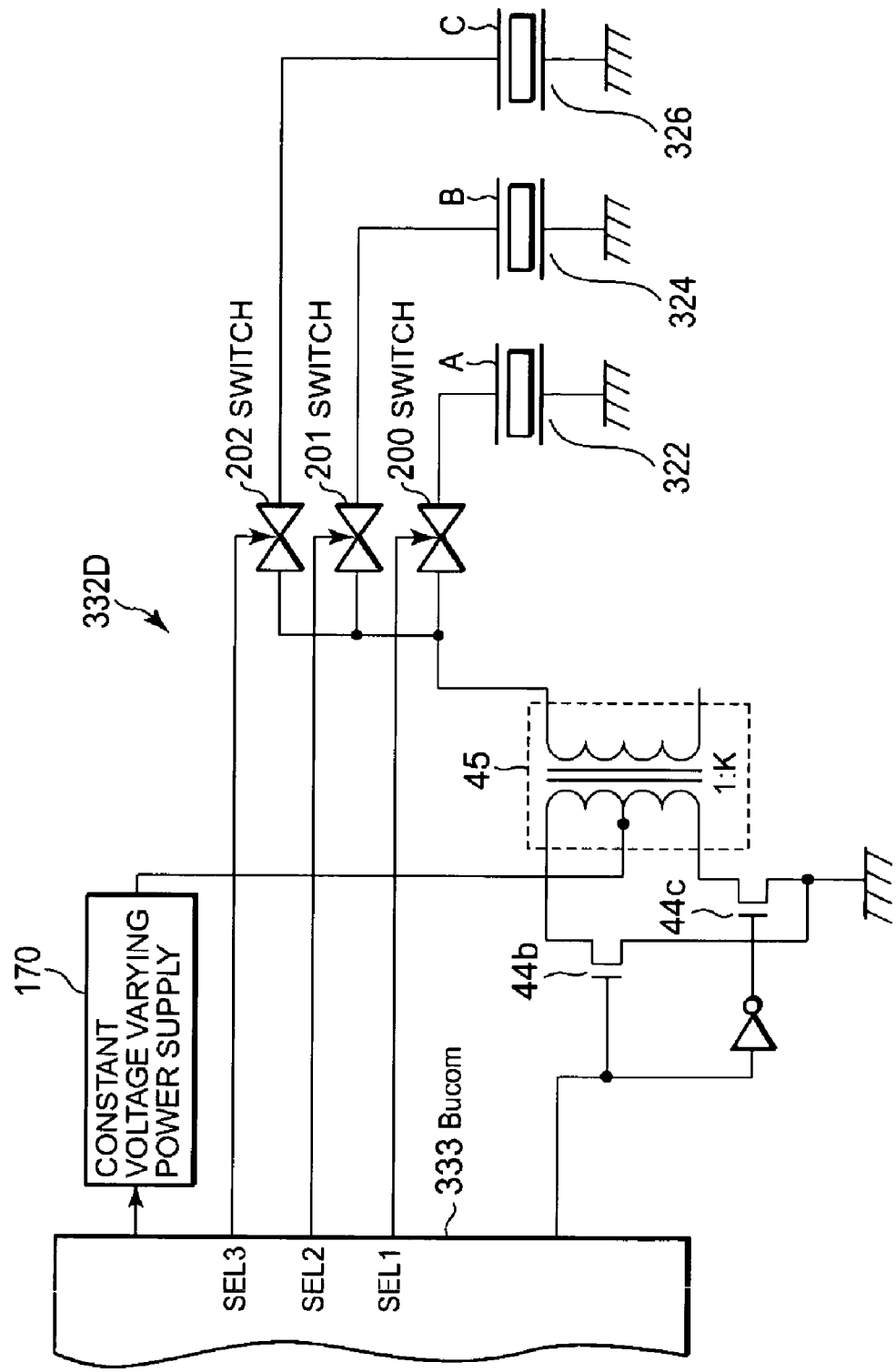
FIG. 24 is a schematic circuit diagram showing a dust-reduction glass driving circuit according to a fifth embodiment of the present invention.

FIG. 24 is a schematic circuit diagram showing an exemplary structure of a dust-reduction glass driving circuit 332D according to the fifth embodiment of the present invention. The following describes only different parts from those in FIG. 3. In the fifth embodiment, the dust-reduction glass driving circuit 332D is provided with a constant voltage varying power supply 170 as a power supply for the primary side of the transformer 45. The Bucom 333 varies the output voltage of the constant voltage varying power supply 170 to change the secondary output voltage of the transformer 45 so as to change the applied voltage to each of the piezoelectric elements 323, 324, and 326, individually. The winding ratio between the primary and secondary sides of the transformer 45 is 1:K.

Figure 25:
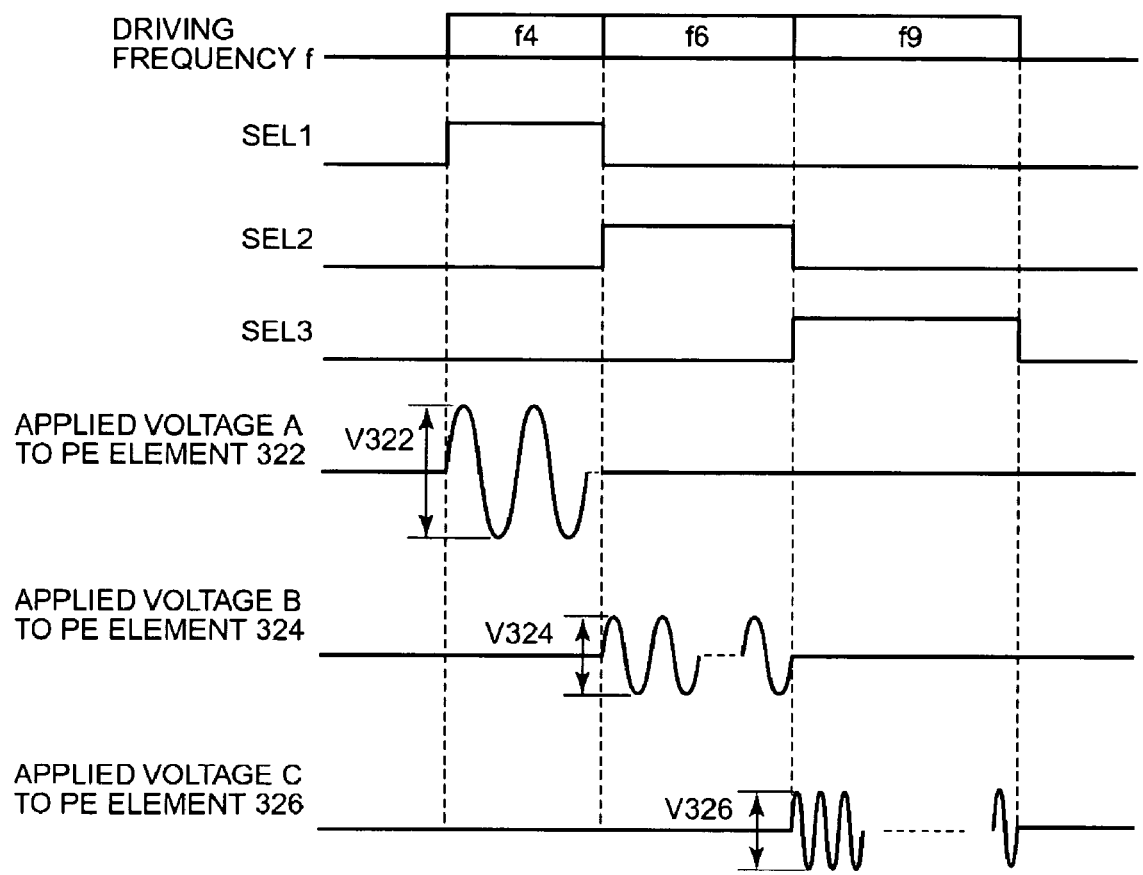
FIG. 25 is a time chart showing an operation control example.

FIG. 25 is a time chart showing exemplary operation control performed by the structure shown in FIG. 24. Like in the third and fourth embodiments, the driving frequencies f are set to three different resonance frequencies f4, f6, and f9 of the dust reduction glasses 321, 323, and 325, respectively.

The operation is started with the driving frequency f4. The Bucom 333 sets the output voltage of the constant voltage varying power supply 170 to V1. Then, when the driving frequency f4 is supplied to the transistors 44*b* and 44*c*, the secondary output voltage V322=K·V1 is generated according to the winding ratio K of the transformer 45. Further, the select signal SEL 1 is changed to the H level (and SEL 2 and SEL 3 are changed to the L level) to turn the switch 200 on and supply the secondary output voltage A of the transformer 45 to the piezoelectric element 322. In this case, the amplitude V 322 of the applied voltage A to the piezoelectric element 322 is K·V1 as mentioned above.

Then, the operation is performed at the driving frequency f6. The Bucom 333 sets the output voltage of the constant voltage varying power supply 170 to V2 (where V2<V1). Then, when the driving frequency f6 is supplied to the transistors 44b and 44c, the secondary output voltage V324=K·V2 is generated according to the winding ratio K of the transformer 45. Further, the select signal SEL 2 is changed to the H level (and SEL 1 and SEL 3 are changed to the L level) to turn the switch 201 on and supply the secondary output voltage B of the transformer 45 to the piezoelectric element 324. In this case, the amplitude V 324 of the applied voltage B to the piezoelectric element 324 is K·V2 as mentioned above, and the value becomes smaller than that of V 322 of the applied voltage A.

Further, the operation is performed at the driving frequency f9. The Bucom 333 sets the output voltage of the constant voltage varying power supply 170 to V3 (where V3<V2<V1). Then, when the driving frequency f9 is supplied to the transistors 44b and 44c, the secondary output voltage V326=K·V3 is generated according to the winding ratio K of the transformer 45. Further, the select signal SEL 3 is changed to the H level (and SEL 1 and SEL 2 are changed to the L level) to turn the switch 202 on and supply the secondary output voltage C of the transformer 45 to the piezoelectric element 326. In this case, the amplitude V 326 of the applied voltage C to the piezoelectric element 326 is K·V3 as mentioned above, and the value becomes smaller than those of V 322 and V324 of the applied voltages A and B.

Thus, according to the fifth embodiment, the output voltage of the constant voltage varying power supply 170 is variably controlled to change the primary voltages of the transformer 45 so that the applied voltage to each of the piezoelectric elements 322, 324, and 326 can be set individually. This enables the supply of voltage necessary for each of the piezoelectric elements 322, 324, and 326 to obtain more efficient vibration. Further, the structure of this embodiment is provided with the switches 200, 201, and 202 so that each of the piezoelectric elements 322, 324, and 326 can be driven selectively in a time-sharing manner, enabling efficient driving.

Sixth Embodiment

Figure 26:
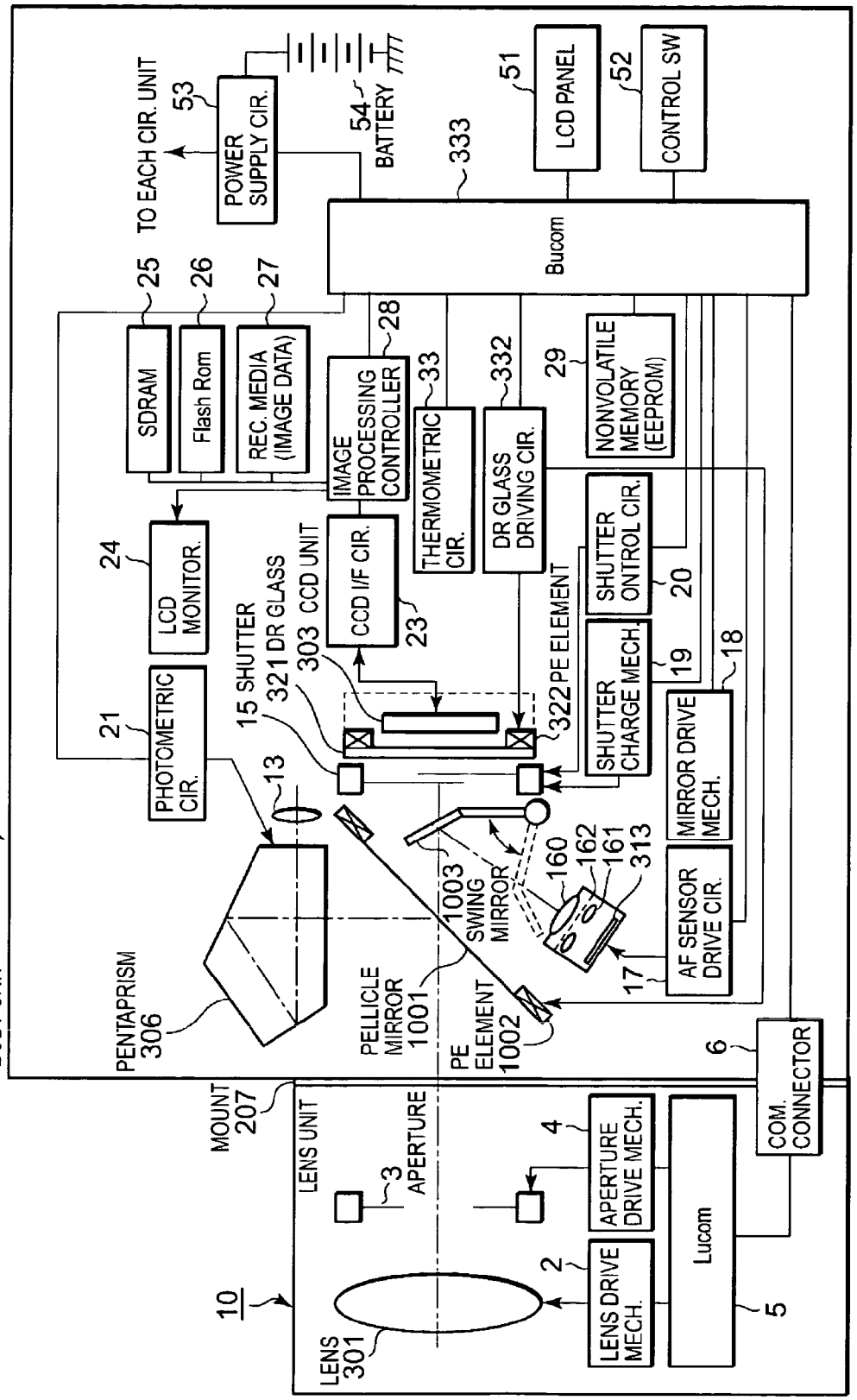
FIG. 26 is a block diagram showing the structure of a sixth embodiment of the present invention.

FIG. 26 is a block diagram of a single lens reflex (SLR) camera as a digital camera system according to the sixth embodiment of the present invention. FIG. 26 shares many components with the block diagram of FIG. 5. The description of the same components as in the block diagram of FIG. 5 is omitted below.

In the SLR camera shown in the block diagram of FIG. 26, the dust reduction glass 321 and a pellicle mirror 1001 (pellicle mirror or pellicle beam splitter) is vibrated. In the embodiments described above, the optical path is divided by the quick-return mirror. Since the quick-return mirror is withdrawn out of the optical path at the time of shooting, dust adhering to the quick-return mirror does not cause degradation of image shots. However, the time required to withdraw the quick-return mirror results in a delay (release time lag) until the next start of shooting. As one of methods for eliminating the delay, there is a technique for replacing the quick-return mirror with the pellicle mirror.

As the pellicle mirror, for example, a translucent mirror made by coating a very thin glass plate or nitrocellulose thin film can be used. The thickness is set so that the pellicle mirror will not cause aberration. The pellicle mirror is fixed to the body so that it branches the flux of light from the taking lens, for example, half to the finder and half to the CCD. Since the pellicle mirror lies on the optical path during shooting, dust adhering to the pellicle mirror causes the degradation of images. Therefore, in the sixth embodiment, the pellicle mirror is also vibrated to remove dust.

An actuator for vibrating the pellicle mirror 1001 is a piezoelectric element 1002. Then, a swing mirror 1003 is arranged between the pellicle mirror 1001 and the shutter 15. The swing mirror 1003 can be set between a position (first position) lying on the optical path and a position (second position) withdrawn from the optical path. When it is set at the first position, the swing mirror 1003 reflects the flux of light from the taking lens 301 to the AF sensor 17. This makes possible focus detection. On the other hand, the swing mirror 1003 is set at the second position during shooting not to cut off the flux of light to the CCD.

Figure 27:
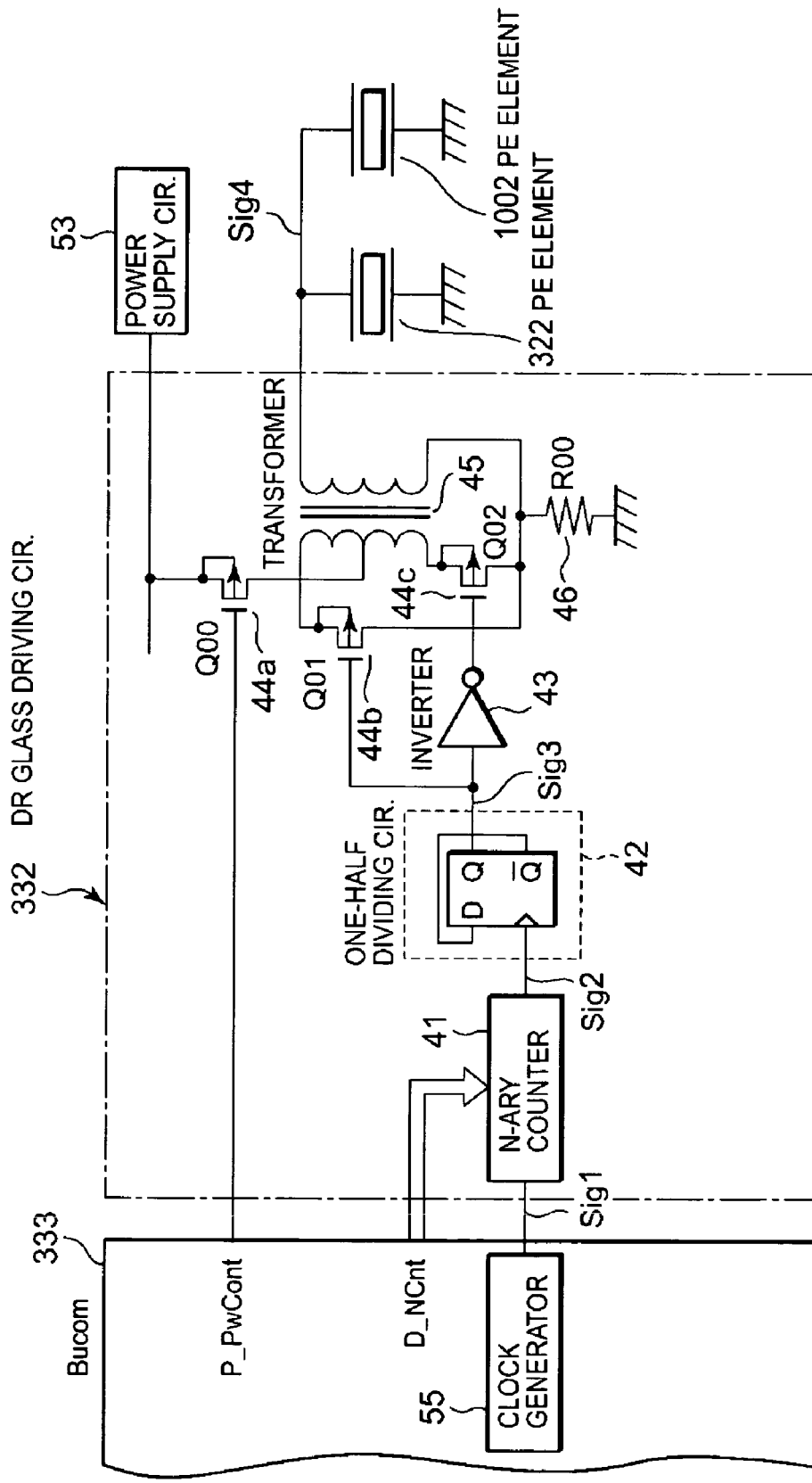
FIG. 27 is a circuit diagram showing the structure of a dust-reduction glass driving circuit.

FIG. 27 is a circuit diagram showing the structure of a dust-reduction glass driving circuit 322 according to the sixth embodiment of the present invention.

The piezoelectric element 1002 for the pellicle mirror 1001 and the piezoelectric element 322 for the dust-reduction glass 321 are driven by a driving signal from the dust-reduction glass driving circuit 332. The structure of the drive circuit 332 is the same as that shown in FIG. 3, except for the structure of the piezoelectric elements driven.

Figure 28:
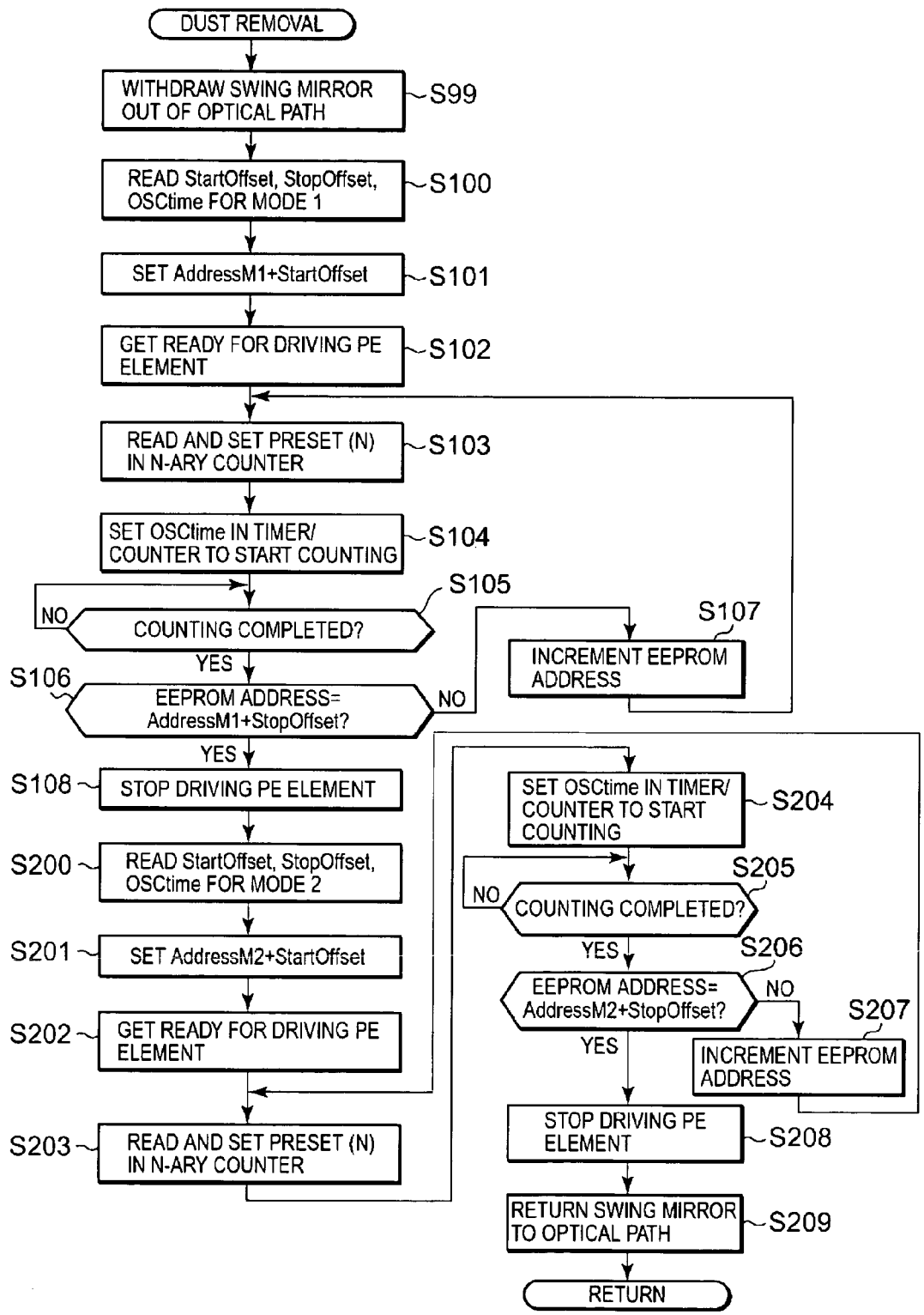
FIG. 28 is a flowchart of dust removal operation.

FIG. 28 is a flowchart showing the operation of the Bucom when the pellicle mirror 1001 and the dust reduction glass 321 are driven to remove dust. The basic operation of the sub routine "dust removal operation" is the same as that described with respect to FIG. 9. In FIG. 28, S100 to S208 are given the same step numbers and the description thereof is omitted.

In the embodiments described above, control is performed for the purpose of vibrating the three dust reduction glasses. On the other hand, in the sixth embodiment, the pellicle mirror 1001 and the dust reduction glass 321 have to vibrate in resonance with each other. The driving frequency of the piezoelectric elements can be set according to the data table stored in the nonvolatile memory 29, as described above with respect to FIGS. 10 to 12. The data table can be changed to set the driving frequency for vibrating both the pellicle mirror 1001 and the dust reduction glass 321 in resonance with each other. Therefore, if the data table is changed, the basic operation can performed according to the sub-routine in FIG. 9.

The flowchart of FIG. 28 includes two steps that are not in the flowchart of FIG. 9. In step S99 (first additional step), the swing mirror 1003 is moved to the second position out of the optical path. This prevents dust removed from the pellicle mirror 1001 from adhering to the swing mirror 1003. The swing mirror 1003 also serves as a member for preventing dust from adhering to the AF sensor unit 314.

After dust is removed from the pellicle mirror 1001 and dust reduction glass 321, the swing mirror 1003 is returned to the first position on the optical path in S209 (second additional step).

Seventh Embodiment

A seventh embodiment relates to an improvement of the sixth embodiment. In the sixth embodiment, the piezoelectric elements are provided for vibrating the pellicle mirror 1001 and the dust reduction glass 321, respectively. On the other hand, the seventh embodiment features that the piezoelectric element for the dust reduction glass also vibrates the pellicle mirror. The system structure is the same as the block diagram of FIG. 26, except that there is no piezoelectric element 1001 in the seventh embodiment.

Figure 29:
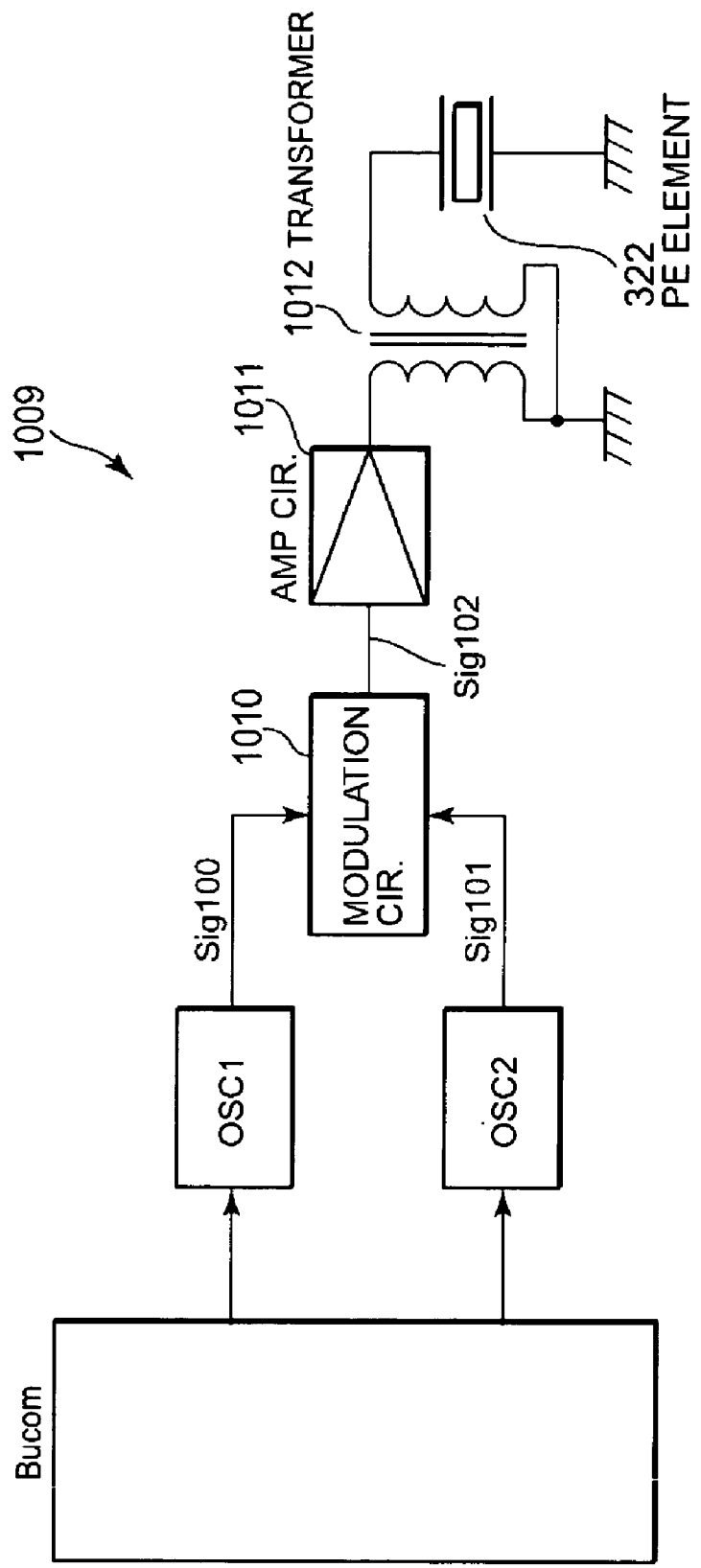
FIG. 29 is a circuit diagram for explaining the structure of a dust-reduction glass driving circuit according to a seventh embodiment of the present invention.
Figure 30A:
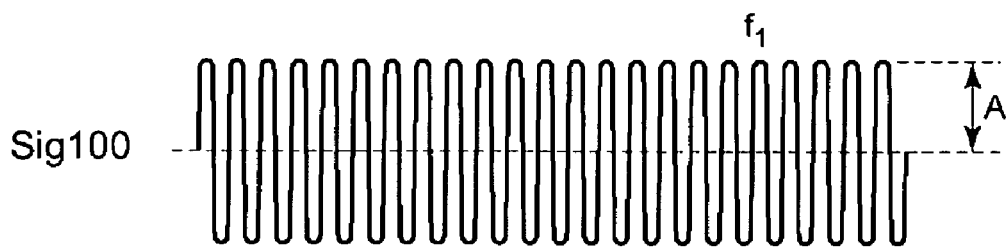
FIGS. 30A to 30C are graphs showing signal waveforms at specific portions of the dust-reduction glass driving circuit of FIG. 29.
Figure 30B:
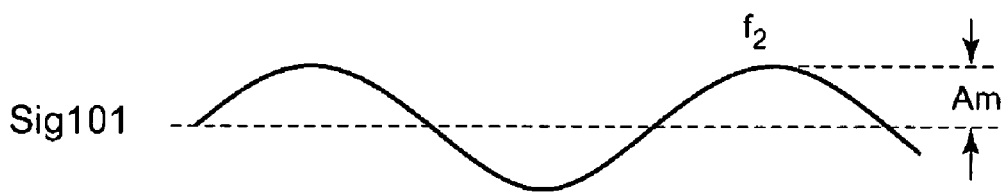
Figure 30C:
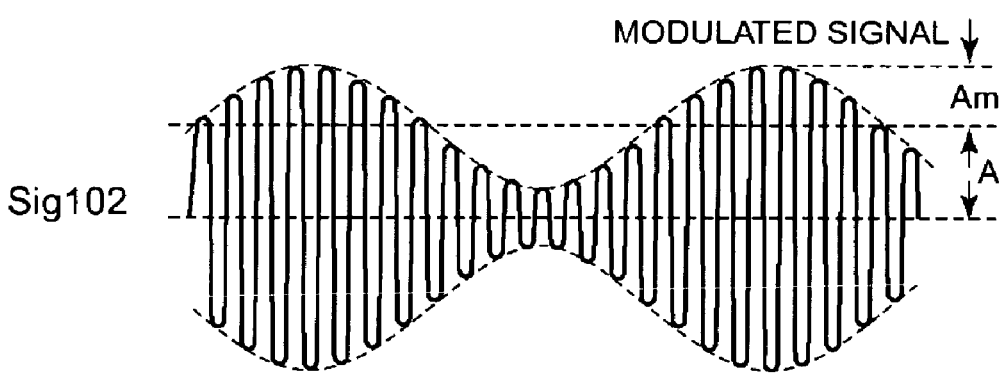

FIG. 29 is a circuit diagram showing the structure of a dust-reduction glass driving circuit according to the seventh embodiment of the present invention. FIGS. 30A to 30C are graphs illustrating the output waveforms of the dust-reduction glass driving circuit.

The structure of the dust-reduction glass driving circuit is largely different from those according to the first to sixth embodiments. The drive circuit 1009 of the seventh embodiment has two oscillating circuits. The oscillating frequency (f1) of a first oscillating circuit OSC 1 is tuned to the resonance frequency of the dust reduction glass 321. The oscillating frequency (f2) of a second oscillating circuit OSC 2 is tuned to the resonance frequency of the pellicle mirror 1001. The outputs of the two oscillating circuits are input into a modulation circuit. The modulation circuit 1010 modulates amplitude. FIG. 30A shows the output of OSC 1, and FIG. 30B shows the output of OSC 2. The modulation circuit uses the output of OSC 1 as a carrier wave to modulate the output of OSC 2 with the amplitude of the carrier wave. FIG. 30C shows the output of the modulation circuit 1010.

The output of the modulation circuit 1010 is power-amplified by an amplifier circuit 1011, and input into a transformer 1012. The transformer 1012 boosts the voltage to a level suited to drive the piezoelectric element 322.

Since the output of the modulation circuit 1010 contains the frequency f1, the dust reduction glass 321 vibrates in a resonant state. Further, since it also contains the frequency f2, the sonic wave emanating from the dust reduction glass 321 varies with the frequency f2. The frequency f2 is the resonance frequency of the pellicle mirror 1001. Therefore, the sonic wave generated by the dust reduction glass 321 can be irradiated to the pellicie mirror 1001 so that the pellicle mirror 1001 vibrates to remove dust therefrom.

In the above description, the modulation circuit 1010 modulates amplitude. As the modulation method, a method of modulating the frequency f2 using the frequency f1 as the carrier wave can be adopted. However, the modulation method is not limited thereto, and any other method can be used as long as the modulation circuit generates an output containing the frequency components f1 and f2. For example, frequency modulation can be adopted.

The two oscillating circuits and the modulation circuit 1010 can also be replaced with a DSP (Digital Signal Processor). In this case, the DSP can combine the modulated signal containing two frequency components with the digital signal to generate a driving signal through a DA converter.

FIG. 31 is a flowchart showing the sub-routine "dust removal operation" suited to the seventh embodiment.

In S300, the swing mirror 1003 is moved from the first position to the second position. This is to prevent dust from adhering to the swing mirror 1003 and the AF sensor unit 314 as described above. Further, in the seventh embodiment, the swing mirror 1003 is moved because it blocks the sonic wave generated by the dust reduction glass 321. Then, in S301, the shutter 15 is opened. This is because the shutter also blocks the sonic wave generated by the dust reduction glass 321. Through steps S300 and S301, there is no obstacle between the dust reduction glass 321 and the pellicle mirror 1001, allowing the sonic wave to be irradiated efficiently.

In S302, the resonance frequency f1 of the dust reduction glass 321 is set to the OSC 1 to start oscillating. In S303, the resonance frequency f2 of the pellicle mirror 1001 is set to the OSC 2 to start oscillating. Then, the modulation circuit 1010 takes in signals from the two oscillating circuits OSC 1 and OSC 2 to generate a driving signal (modulated signal). In S304, the procedure waits for a predetermined period to vibrate the dust reduction glass 321.

In S305, the operation of OSC 1 is stopped, and in S306, the operation of OSC2 is stopped. Through these two steps, the dust reduction glass 321 stops vibrating. In S307, the shutter 15 is closed. Then, in S308, the swing mirror 1003 is moved back from the second position to the first position.

In the sub-routine "dust removal operation" shown in FIG. 9, the operation for eliminating the variations in the resonance frequency caused by the individual difference among the dust reduction glasses is performed. In other words, the dust reduction glasses are driven at respective frequencies to tune the driving frequency to the resonance frequency of each dust reduction glass. On the other hand, FIG. 31 does not mention that the dust reduction glasses are driven at respective frequencies. However, if the driving signal for the dust reduction glass 321 is generated by varying the frequencies to be set in OSC 1 and OSC 2, the dust reduction glass 321 and the pellicle mirror 1001 can vibrate in resonance with each other without fail.

According to the first to seventh embodiments, multiple dust reduction optical components (dust reduction glass, pellicle mirror) are driven with the same frequencies. However, the degree of dust adhesion varies in the position at which each dust reduction optical component is arranged. The dust removal operation can be performed by taking this condition into account.

In the sixth embodiment, there are the dust reduction glass 321 for the CCD and the pellicle mirror 1001 as dust reduction optical components. Dust is likely to stick to the pellicle mirror 1001 when the taking lens is attached to or detached from the body. On the other hand, dust is likely to stick to the dust reduction glass 321 for the CCD when the shutter 15 is driven and the air near the dust reduction glass 321 is scattered. Therefore, the dust removal operation can be set such that the removal of dust from the pellicle mirror 1001 is done at the time of changing the lenses and the removal of dust from the dust reduction glass is done at the time of driving the shutter. In the sub-routine "dust removal operation" described above, all the dust reduction optical components arranged in the camera are driven, but sub-routines for driving the dust reduction optical components individually can also be created. In this case, a dust reduction optical component to which dust is likely to stick can be driven according to the operation conditions of the camera.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An optical apparatus with dust reduction capability comprising:
    a plurality of optical units, each of which includes
        a photoelectric converter for receiving an optical image formed through an imaging optical system and converring it to an electric signal,
        a dust reduction optical element arranged in front of tae photoelectric converter along the optical path, and a vibration exciting element for vibrating the dust reduction optical element; and a single drive control circuit for controlling the drive of each of the plurality of vibration exciting elements included in these optical units.

2. The apparatus according to claim 1, wherein
the drive control circuit drives each of the vibration exciting elements to scan a predetermined frequency range including the resonance frequency of each of the optical elements.

3. The apparatus according to claim 2, wherein
The optical elements have resonance frequencies different from one another, and the drive control circuit drives each of the vibration exciting elements to scan a predetermined frequency range including all the different resonance frequencies of the optical elements.

4. The apparatus according to claim 1, wherein
the drive control circuit selectively drives each of the vibration exciting elements to vibrate each of the optical elements in a time-sharing manner.

5. The apparatus according to claim 4, wherein
The optical elements have resonance frequencies different from one another, and the drive control circuit selectively drives each of the vibration exciting elements to scan a predetermined frequency range including the resonance frequency of each of the optical elements so as to vibrate the optical element in a time-sharing manner.

6. An electronic camera with dust reduction capability comprising:

a plurality of optical units, each of which includes
a photoelectric converter for receiving an optical image formed through an imaging optical system and converting it to an electric signal, a dust reduction optical element arranged in front of the photoelectric converter along the optical path, and an electromechanical conversion element for vibrating the dust reduction optical element;

a single drive circuit for driving each of the plurality of electromechanical conversion elements included in these optical units; and a control circuit for controlling the operation of the drive circuit.

7. The electronic camera according to claim 6, wherein
the drive circuit has a switching circuit for selectively driving each of the electromechanical conversion elements, and the control circuit controls the operation of the drive circuit to change the driving frequencies depending on the electromechanical conversion element selectively driven.

8. The electronic camera according to claim 6, wherein
the drive circuit has an applied voltage varying circuit for varying the applied voltage to each of the electromechanical conversion elements on an element basis.

9. The electronic camera according to claim 6, wherein
the drive circuit has an applied voltage varying circuit for varying the applied voltage to each of the electromechanical conversion elements on an element basis, and a switching circuit for selectively driving each of the electromechanical conversion elements, and the control circuit controls the operation of the applied voltage varying circuit to change the applied voltage depending on the electromechanical conversion element selectively driven.

10. The electronic camera according to claim 6, wherein
the drive circuit has a switching circuit for selectively driving each of the electromechanical conversion elements, and the control circuit controls the operation of the drive circuit to change the driving time depending on the electromechanical conversion element selectively driven.

11. The electronic camera according to claim 6, wherein
at least one of the plurality of optical units is an imaging optical unit including a photoelectric converter for receiving an optical image formed through an imaging optical system, and at least one of the plurality of optical units is a finder optical unit including a photoelectric converter for receiving an optical image formed through a finder optical system.

12. The electronic camera according to claim 6, wherein
at least one of the plurality of optical units is an imaging optical unit including a photoelectric converter for receiving an optical image formed through an imaging optical system, and at least one of the plurality of optical units is a focus detection optical unit including a photoelectric converter for receiving an optical image formed through a focus detection optical system.

* * * * *